United States Patent
Kobayashi et al.

(10) Patent No.: US 7,019,722 B2
(45) Date of Patent: Mar. 28, 2006

(54) RECORDING METHOD, PHOTO ADDRESSABLE RECORDING MEDIUM, DISPLAY DEVICE AND RECORDING DEVICE

(75) Inventors: Hideo Kobayashi, Nakai-machi (JP); Hiroshi Arisawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 358 days.

(21) Appl. No.: 09/912,315

(22) Filed: Jul. 26, 2001

(65) Prior Publication Data
US 2002/0012042 A1    Jan. 31, 2002

(30) Foreign Application Priority Data
Jul. 28, 2000 (JP) .................. 2000-228566

(51) Int. Cl.
*G09G 3/34* (2006.01)
(52) U.S. Cl. .................. 345/84; 345/94
(58) Field of Classification Search .............. 345/211, 345/102, 207, 89, 94, 97, 87, 84; 250/214 LA; 349/17, 24, 25, 31, 33, 2, 133; 365/108; 348/739; 359/246, 294
See application file for complete search history.

(56) References Cited

U.S. PATENT DOCUMENTS

| | | | | |
|---|---|---|---|---|
| 3,575,634 A | * | 4/1971 | Kohashi | 250/214 LA |
| 3,700,936 A | * | 10/1972 | Shimizu | 310/319 |
| 5,153,761 A | * | 10/1992 | Marlor | 349/25 |
| 5,516,607 A | * | 5/1996 | Iijima et al. | 430/20 |
| 5,841,489 A | * | 11/1998 | Yoshida et al. | 349/17 |
| 6,388,649 B1 | * | 5/2002 | Tanaka et al. | 345/89 |
| 6,429,839 B1 | * | 8/2002 | Sakamoto | 345/87 |
| 6,441,828 B1 | * | 8/2002 | Oba et al. | 345/659 |

FOREIGN PATENT DOCUMENTS

| | | | |
|---|---|---|---|
| JP | 07-225387 | * | 8/1995 |
| JP | A 2001-100664 | | 4/2001 |

OTHER PUBLICATIONS

"Liquid Crystal Spatial Light Modulator and Optical Information Processing", EKISHO, vol. 2, No. 1, 1998 pp. 3-11.
Seiji Fukushima et al., "Ferroelectric liquid-crystal spatial light modulator achieving bipolar image operation and cascadability", Applied Optics '92, vol. 31, No. 32, 1992, pp. 6859-6868.
H. Yoshida et al., "Reflective Display with Photoconductive Layer and a Bistable Reflective Cholesteric Mixture", SID 96 Applications Digest, 1996, pp. 59-62.

* cited by examiner

*Primary Examiner*—Xiao Wu
*Assistant Examiner*—Kevin M. Nguyen
(74) *Attorney, Agent, or Firm*—Oliff & Berridge PLC

(57) ABSTRACT

A recording method by which rewriting is performed with high sensitivity and favorable display on-off operation is performed, and which may be driven by a compact, low-cost power supply, and further make color display, a photo addressable recording medium, a display device and a recording device which are used in the recording method are provided. According to the recording method, voltage is applied to the photo addressable recording medium having an optical switching element, the resistance component of which is controlled at least according to the direction of applied voltage and a display element, and the ratio of the resistance component depending on the direction of applied voltage of the optical switching element is controlled to control the charge storage amount to the display element, thereby controlling the display. The photo addressable recording medium, the display device and the recording device are used in the recording method.

22 Claims, 16 Drawing Sheets

WAVEFORM APPLIED TO DISPLAY ELEMENT
DURING LIGHT IRRADIATION

WAVEFORM APPLIED TO DISPLAY ELEMENT
DURING NON-IRRADIATION

WAVEFORM APPLIED TO DISPLAY ELEMENT
DURING LIGHT IRRADIATION

WAVEFORM APPLIED TO DISPLAY ELEMENT
DURING NON-IRRADIATION

WAVEFORM APPLIED TO DISPLAY ELEMENT
DURING LIGHT IRRADIATION

- 18 CHARGE GENERATING LAYER
- 16 CHARGE TRANSPORT LAYER
- 14 CHARGE GENERATING LAYER
- 12 CONDUCTIVE FILM (ELECTRODE)
- 10 SUBSTRATE

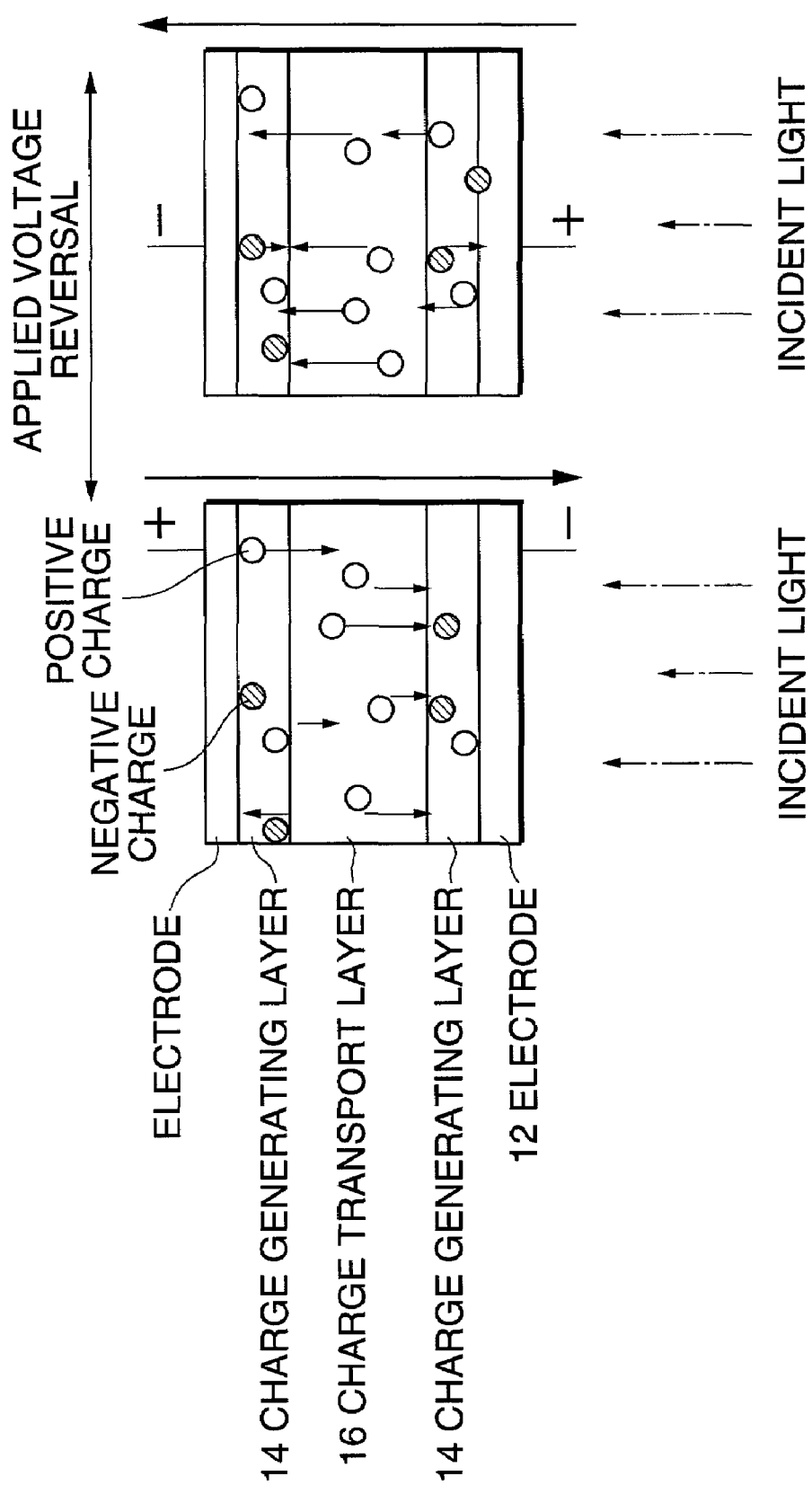

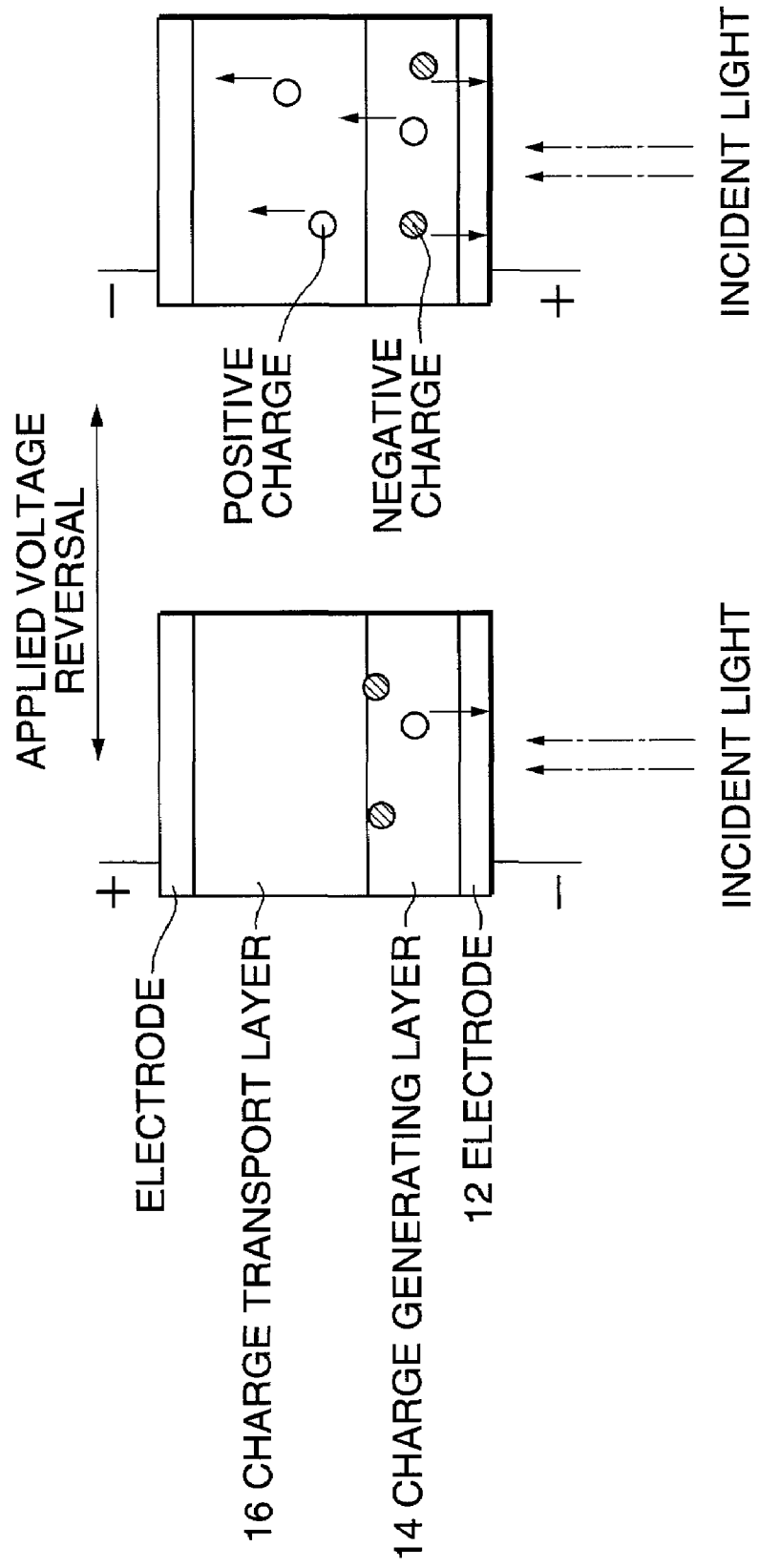

(NON-IRRADIATION, DISPLAY OFF)

(LIGHT IRRADIATION, DISPLAY ON)

TIME (s)
(NON-IRRADIATION)

TIME (s)
(LIGHT IRRADIATION)

RECORDING METHOD, PHOTO ADDRESSABLE RECORDING MEDIUM, DISPLAY DEVICE AND RECORDING DEVICE

BACKGROUND OF THE INVENTION

1. Field of the Invention

This invention relates to a recording method, a photo addressable recording medium used for it, a display device and a recording device.

2. Description of the Related Art

In recent years, a photo addressable spatial light modulating device having a combination of a photoconductive switching element and a display element has been developed and put into practical use as a light valve in a projector and the like, and in addition, as mentioned in "Liquid Crystal Spatial Light Modulator and Optical Information Processing", EKISHO, Vol. 2, No. 1, 1998, pp. 3–11, its possibility in the field of optical information processing has been discussed.

The photo addressable spatial light modulating device is formed by at a least photo addressing unit, an optical switching element and a display device, and adapted to apply designated voltage between the optical switching element and the display element and simultaneously vary the impedance of the photoconductive switching element according to the amount of received light to control the voltage applied to the display element and drive the display element, thereby displaying an image. Further, attention has been focussed on a photo addressable recording medium, in which an element having a memory property is used as the display element of the photo addressable spatial light modulating device to be separable from the writing unit.

As these elements capable of controlling voltage or current according to the amount of received light, in addition to a photo diode used in CCD and an amorphous silicon element used in a contact type image sensor, for an organic photoreceptor element, a two-layer functional separation type optical switching structure used in Elgraphy and a three-layer functional separation type organic optical switching element 10 have been examined. This organic photosensitive element has the advantages that it is applicable to an AC drive liquid crystal element or the like and that it is also applicable to a flexible substrate such as a PET film because high temperature heat treatment is not required.

As a display control element of a photo addressable medium, examination has been made on liquid crystal display elements such as nematic liquid crystal which is dispersed in polymer to have a memory property, cholesteric liquid crystal, ferroelectric liquid crystal and elements formed by high-polymer dispersing these liquid crystal or encapsulating the same, or an element formed by encapsulating a field rotary element, a toner display element, an electrophoretic element and the like.

Writing to such photo addressable medium is normally performed as follows. During irradiation with light, resistance of an optical switching element is lowered due to photoconductivity, so that most of voltage applied to the medium is divided to a display element part. At this time, to turn on a display, voltage above the threshold is applied to turn on a display. On the other hand, during non-irradiation with light, resistance of the optical switching element is increased, most of the applied voltage is divided to the optical switching element and the applied voltage to the display element drops below the threshold, so that the display is turned off.

The light irradiation area and the non-irradiation area are controlled to display an image.

The ordinary photo addressing element, as described, has the problem that as the variation of the resistance component due to light irradiation is large, high sensitivity cannot be obtained. It is because, in order to control the on-off state of the display, normally the resistance during irradiation should be $1/100$ to $1/1000$ as compared with the resistance during non-irradiation. For example, Fukushima et al. have proposed that the resistivity of a-Si film which is an optical switching element is lowered from $10E^{11}$ Ωcm to $10E^{8}$ Ωcm by irradiation of 1 mw/cm$^2$ on pp 6859–6868 "Ferroelectric liquid-crystal spatial light modulator achieving bipolar image operation and cascadability", APPLIED OPTICS '92 Vol. 31, No. 32, 1992, pp. 6859–6868. It is a matter of course that the display may be controlled by reducing the resistance value to $1/10$, but a margin is small. Further, in the case of the display element or the optical switching element, since the time constant is several tens of msec to as large as several seconds, it requires time for setting until reaching a resistance divided value. When rewriting in a shorter time, the applied voltage becomes equal to or lower than the dividing proportion, and the margin becomes smaller so that it is difficult to control the display.

Consequently, the writing frequency is lowered to several tens of Hz and to several Hz in some cases, and further in the case of cholesteric liquid crystal or an element like a field rotary element, there is the problem that since the driving voltage is high and it is necessary to supply low-frequency/high driving voltage as a power supply, a large, high-cost power supply is needed.

Further, the display element having memory function used in recording has the problem that coloration is difficult. In coloration, in the case of using a ferroelectric liquid crystal element, for example, a display is made using a color filter by matrix drive, but in the case of recording, the problem is that there is no accuracy of addressing, so it is difficult to secure the accuracy of radiating a desired amount of light to a designated position of the filter. Of course, there are other ways of coloration, but none of them is put into practical use because of their own problems.

SUMMARY OF THE INVENTION

The present invention has been made in view of the above circumstances and provides a recording method by which rewriting is performed with high sensitivity and favorable display on-off operation is performed, and which may be driven by a compact, low-cost power supply and further make color display, and a photo addressable recording medium for use in the recording method.

The problems of the prior art are overcome by providing the following recording method and photo addressable recording medium for use in the method.

According to an aspect of the present invention, the recording method is provided for a photo addressable recording medium including an optical switching element and a display element, the resistance component of the optical switching element is controlled at least depending on the direction of applied voltage. The term "direction of applied voltage" as used herein is defined as the direction from a point of relatively positive electrostatic potential to a point of relatively negative electrostatic potential. The term "voltage polarity" refers to whether the electrostatic potential of a first point is positive or negative relative to the electrostatic potential of a second point. The method includes the step of controlling a display of the display element by controlling a ratio of the resistance component of the optical switching element depending at least on the applied voltage direction to control an electrical charge amount of the display element.

According to the method, favorable display on-off operation is performed even with a small amount of light to attain high sensitivity, and the drive is achieved by AC voltage with frequency of 500 Hz or more so that a compact, low-cost power supply can be used. Further, the recording method of the present invention enables color display.

According to another aspect of the present invention, the photo addressable recording medium used in the method described above has an optical switching element, the resistance component of which is controlled at least according to the direction of applied voltage, and a display element.

According to another aspect of the invention, the display device used in the method described above includes a photo addressable recording medium having an optical switching element, the resistance component of which is controlled at least according to the direction of applied voltage, and a display element, a recording medium driving unit that drives the recording medium, a photo addressing unit that performs recording to the recording medium, and a control unit.

According to an another aspect of the present invention, the recording device used in the recording method described above includes at least a recording medium driving unit connected to a photo addressable recording medium having an optical switching element, the resistance component of which is controlled at least according to the direction of applied voltage and a display element, a photo addressing unit that performs recording to the recording medium, and a control unit.

BRIEF DESCRIPTION OF THE DRAWINGS

Preferred embodiments of the present invention will be described in detail based on the followings, wherein:

FIG. 6A shows the optical switching element having a photoconductive layer of a three-layer structure; and FIG. 6B shows the optical switching element having a photoconductive layer of a two-layer structure;

FIG. 7 is a diagram showing the direction of an electric current in the case of applying light to the optical switching element of a three-layer structure;

FIG. 8 is a diagram showing the direction of an electric current in the case of applying light to the optical switching element of a two-layer structure;

FIG. 9A shows the photo addressable recording medium having a photoconductive layer of a three-layer structure; and FIG. 9B shows the photo addressable recording medium having a photoconductive layer of a two-layer structure;

FIG. 10A shows a rectangular wave; and FIG. 10B shows a sinusoidal wave;

FIG. 16A shows the waveform of voltage in the case of non-irradiation; and

FIG. 16B shows the waveform of voltage in the case of irradiation;

FIG. 17A shows the waveform of voltage in the case of non-irradiation; and FIG. 17B shows the waveform of voltage in the case of irradiation; FIG. 18A shows the waveform of voltage in the case of non-irradiation; and FIG. 18B shows the waveform of voltage in the case of irradiation.

DESCRIPTION OF THE PREFERRED EMBODIMENTS

According to the invention, the recording method uses a photo addressable recording medium which has an optical switching element whose resistance component ratio (hereinafter sometimes referred to as "asymmetric rate" $\Delta$asym) based on the direction of applied voltage at least may be controlled by light irradiation and a display element, applies an alternating current electric field to the photo addressable recording medium, and controls the ratio of resistance component of the optical switching element to control the storage amount of charges to the display layer, thereby controlling the on-off operation of a display. The ratio of resistance component may be controlled by light, electric energy, heat energy and the like, but the following description deals with an example of a method in which an optical switching element is used as a switching element and the resistance component ratio is controlled by light (amount).

Figure 1:
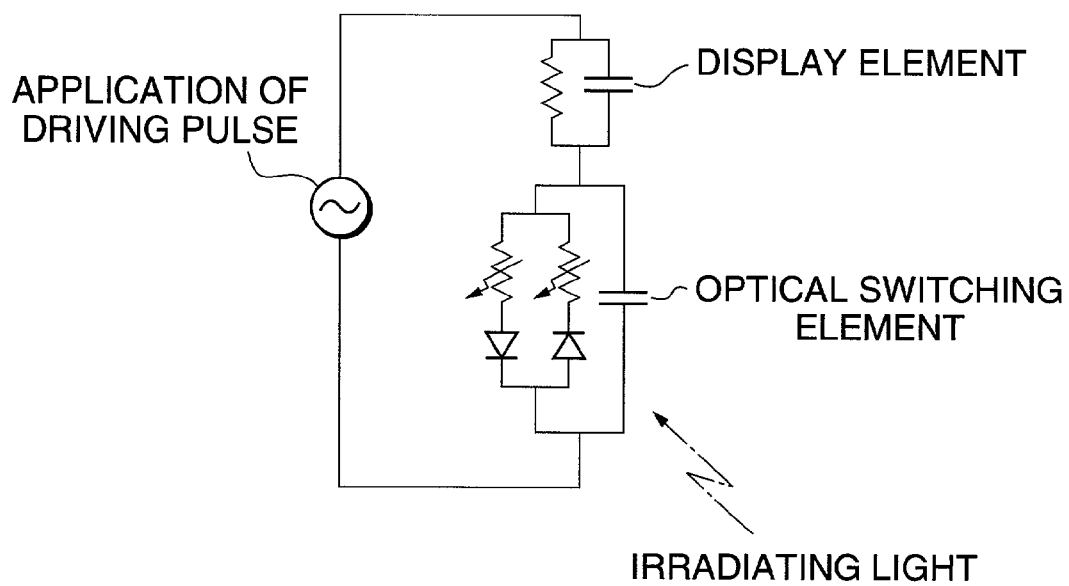
FIG. 1 shows an equivalent circuit of a photo addressable recording medium in the recording method of the present invention.

FIG. 1 shows an equivalent circuit of a photo addressable recording medium used in the invention. As shown in FIG. 1, it is characterized in that in the case of radiating light, the resistance component is varied between the case where an electric current flows from the optical switching element side to the display element side and the case where the electric current flows from the display element to the optical switching element. Concerning the direction of applying voltage, in the following description, the case of flowing from the optical switching element side to the display element side is taken as the positive direction, and the case of flowing from the display element to the optical switching element is taken as the negative direction for convenience.

In the case of AC driving the photo addressable recording medium of the invention, when light is applied to the optical switching element of the photo addressable recording medium, the ratio (symmetric property to OV) of the resistance component of the element is varied so that the current flowing direction has low resistance in one polarity and high resistance in the other polarity (asymmetric property of resistance). In the case of low resistance polarity, applied voltage to the display element becomes high, and on the other hand, in the case of high resistance polarity, the applied voltage to the display element becomes low, so that in the low resistance polarity, the voltage applied to the display element becomes relatively high (bias component due to a decrease in resistance). The electric charges are stored in the display element depending on the above asymmetric property, and the voltage by such charge storage is also additionally applied (bias component due to asymmetry).

The recording method of the invention is characterized in that the on and/or operation of a display is controlled by utilizing the superposition effect of the above bias components due to decrease in resistance and asymmetry. For example, when voltage equal to or lower than the threshold is applied to radiate light in the off-state of the display (there is no difference in resistance component in this state), the resistance component of the optical switching element is varied to be asymmetric, the applied voltage to the display element in the low resistance polarity is increased, and also electric charges are stored in the display element due to such an asymmetric property to further apply voltage (superposition effect of bias components) so that the voltage equal to or higher than the threshold is effectively applied to the display element to turn on the display.

In the state where the voltage equal to or higher than the threshold is applied to the display element, when light irradiation is turned off (or small amount of light irradiation), residual voltage is applied to the display element by stored electric charges (after that, the charges cause relaxation discharge), and in the process where the voltage drops, the same result as that in applying an erasing pulse to the display element is produced to turn off the display.

Further, as the charge storage method using asymmetric property, in addition to the method of directly controlling the asymmetric property by controlling the amount of light as described above to store electric charges, cited is a method of controlling the resistance value itself by light, that is, the method utilizing a phenomenon that when it is dark, the resistance value is remarkably larger than the display element so that an electric current does not flow and the charge storage is not so large, but when it is light, resistance is decreased and the amount of electricity is increased to enlarge the charge storage.

The recording method of the invention in which electric charges are stored in the display element will now be described in detail. The description deals with the case of using an organic optical switching element constructed so that during small light amount irradiation (or during non-irradiation, hereinafter referred to as "non-irradiation" for small light amount irradiation and non-irradiation collectively), the resistance component of the optical switching element is isotropic to the direction of applied voltage and the non-asymmetric rate is about 1, and during light irradiation, the anisotropy of the resistance component to the direction of applied voltage is high, and using as a display element a cholesteric liquid crystal element having two thresholds.

Figure 2:
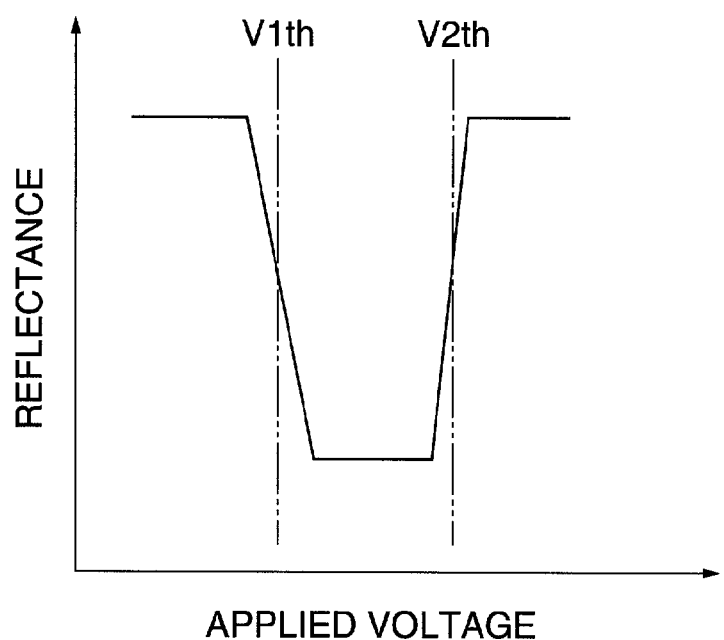
FIG. 2 shows the relationship between the voltage and the reflectivity of a liquid crystal element having two thresholds.

FIG. 2 shows the applied voltage reflectivity characteristic of the cholesteric liquid crystal. The axis of ordinates shows the reflectivity and the axis of abscissas shows the applied voltage. The cholesteric liquid crystal has a first threshold $V_{1th}$ and a second threshold $V_{2th}$, and at the first threshold, the reflectivity is low, and at the second threshold $V_{1th}$, the reflectivity is high. The smaller the first threshold $V_{2th}$ is, the smaller relaxation after charge storage is enough to erase.

Figure 3A:
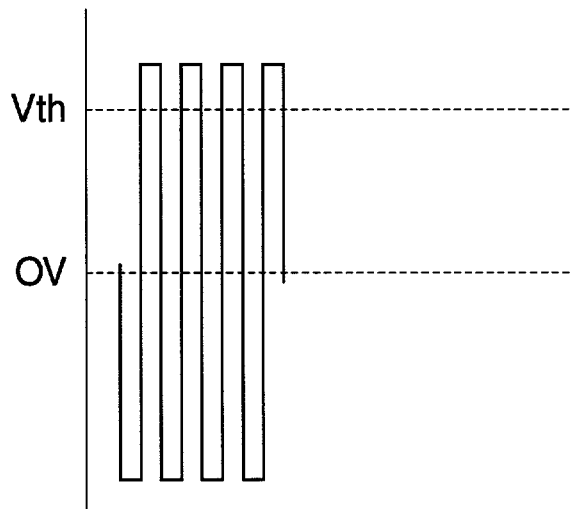
FIGS. 3A and 3B show the waveform of voltage applied to a display element in the negative recording method.
Figure 3B:
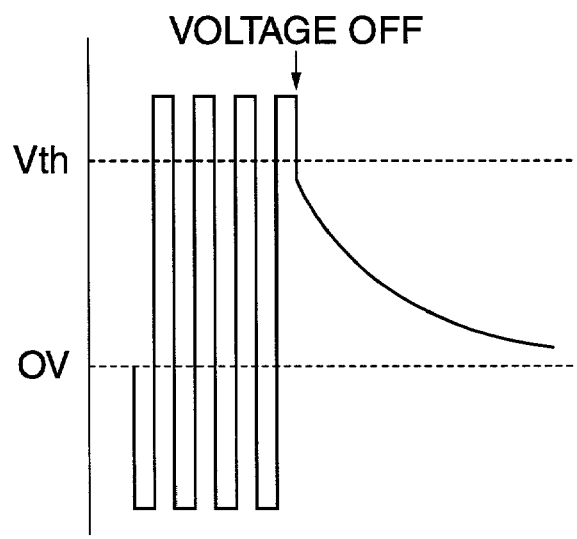

First, the negative recording mode will now be described. The negative recording mode is a recording method in which voltage equal to or higher than the second threshold is applied to the display element both during non-irradiation and during light irradiation, and during non-irradiation, the display is turned on, and then during light irradiation, the display is turned off. As shown in FIG. 3A, in the case of AC driving, during non-irradiation, the asymmetric rate is about 1 (symmetrical), and there is no difference in resistance component value due to direction. Since the voltage exceeding the second threshold voltage is applied to the display element, the display is turned on. When light is applied, the asymmetric rate of the optical switching element is varied, and as shown in FIG. 3B, when voltage is applied in the direction of low resistance component, the applied voltage to the display element is increased, and electric charges are stored in the display element due to the asymmetric property. When the voltage is turned off, the residual voltage depending on the stored charges is applied to the display element. In the relaxation process in which the stored charges cause discharge, the same state as that in the case of applying an erasing pulse to the display element is brought to turn off the display. This charge storage enables high-sensitivity recording because even if the variation in the resistance component due to the light amount control is small, as long as there is enough charge storage time, favorable display on-off operation is attained. On the other hand, in the case where the asymmetric rate is larger, of course, writing is enabled in short time.

Figure 4A:
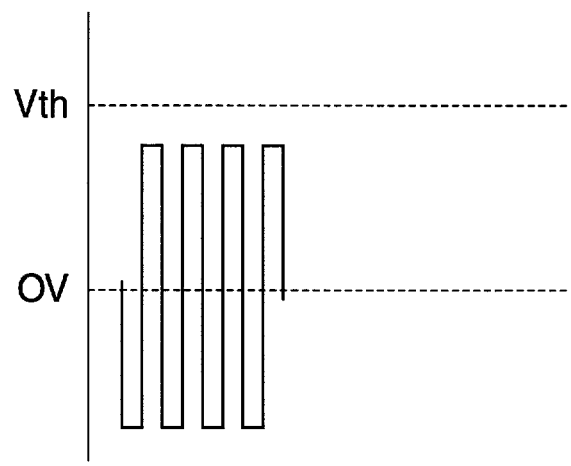
FIGS. 4A and 4B show the waveform of voltage applied to a display element in the positive recording method.
Figure 4B:
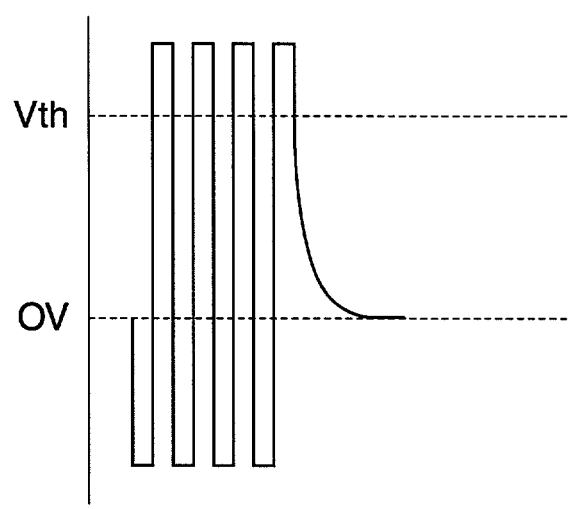

On the other hand, in the case of positive recording mode, recording is performed as in the following. In the positive recording mode, during non-irradiation with light, the applied voltage to the display element is made equal to or lower than the threshold to turn off the display, and on the other hand, applied voltage equal to or higher than the threshold is applied to the display element by light irradiation to turn on the display. FIG. 4A shows that during non-irradiation, in the case of applying voltage equal to or lower than the threshold, there is no difference in resistance component of the optical switching element. FIG. 4B shows that in the case of applying light to the photo addressable recording medium put in the state of FIG. 4A, the resistance component of the optical switching element is varied so that applied voltage higher than the display element is applied in one polarity, whereby writing is enabled in the positive recording method. In FIG. 4B, with an increase in applied voltage to the display element due to a decrease in resistance of the optical switching element caused by light irradiation, added is effective bias application based on the charge storage to the display element due to asymmetric property. Accordingly, the voltage equal to or higher than the threshold is easily applied to the display element to enable positive recording.

Also in the case of positive recording method, applied voltage to the display element is increased by a decrease in resistance due to light irradiation and charge storage, so that as compared with the case of controlling the display only by a decrease in resistance caused by light irradiation, high sensitivity is achieved. In this case, however, it is necessary to prevent display quality from being deteriorated by discharge relaxation of charges stored in the display element. In many cases, the applied voltage becomes lower as compared with that in the negative recording mode, so it does not matter.

Further, color display is enabled by using plural display layers and an optical switching element whose asymmetric rate may be controlled by an amount of light. FIG. 5 shows a conceptual drawing of color display. In this example, the display element has an R layer, a B layer and a G layer using cholesteric liquid crystal, which are stacked in order. The applied voltage reflectivity characteristic of the cholesteric liquid crystal is as shown in FIG. 2. The threshold voltage is $V_R<V_B<V_G$. The cholesteric liquid crystal layer is provided with a first threshold $V_{1th}$ which causes low reflectivity and a second threshold $V_{2th}$ which causes high reflectivity, and ranked in the ascending order of magnitude are $V_{1th-R}$, $V_{1th-B}$, $V_{1th-G}$, $V_{2th-R}$, $V_{2th-B}$ and $V_{2th-G}$. The smaller the first threshold is, the less relaxation after charge storage is enough to erase. For example, in the comparison between the R layer and the G layer, the R layer is erased by the smaller charge storage.

The color display will be described with reference to the drawings. In FIGS. 5A to 5G, the relationship among the voltage applied to the R layer, the B layer and the G layer of the display element and two thresholds of the R layer, B layer and G layer shows the mode of performing color display by applying light of amount gradually increased ($L_0$ to $L_6$) from FIG. 5A to FIG. 5G in the condition where the voltage which is higher than $V_{1th-G}$ and lower than $V_{2th-R}$ is applied to the cholesteric liquid crystal element.

Figure 5A:
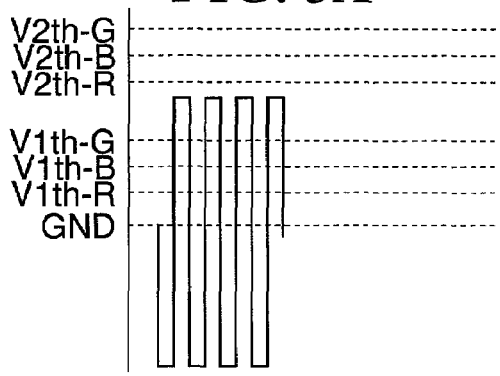
FIGS. 5A to 5G are diagrams for explaining the color display in the case of adopting the recording method of the present invention in color display by the relationship between the voltage applied to the respective layers of RGB and the threshold.
Figure 5E:
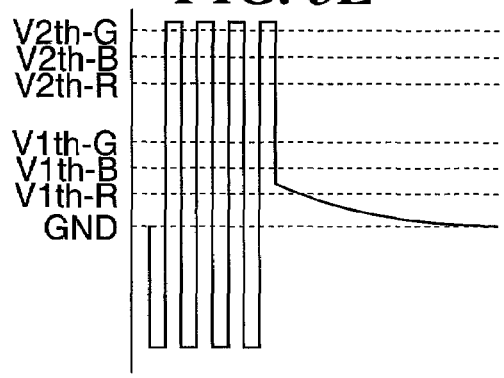
Figure 5B:
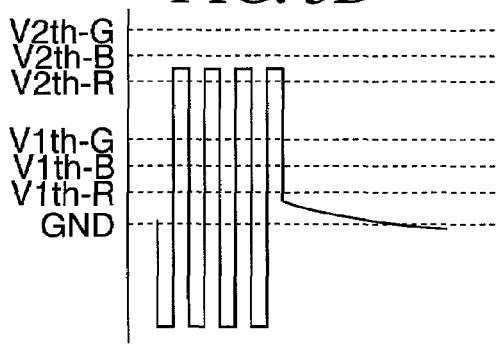
Figure 5F:
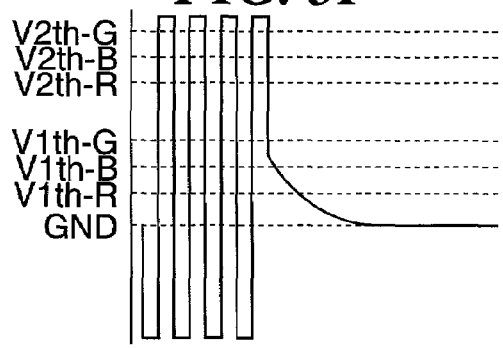
Figure 5C:
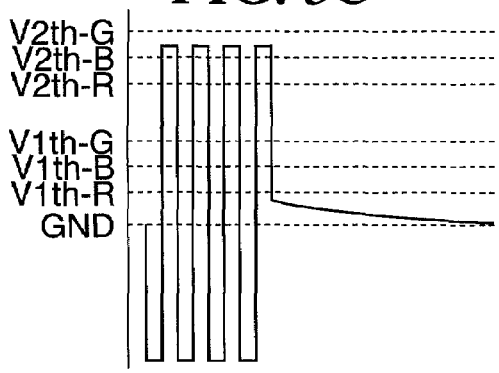

FIG. 5A shows the condition where the voltage which is higher than $V_{1th-G}$ and equal to or lower than $V_{2th-R}$ is applied to the display element during non-irradiation with light ($L_0=0$), and in this case, all of the R layer, the B layer and the G layer are in the off-state of display, that is, black. FIG. 5B shows the condition where light of amount $L_1$ is radiated in the state of FIG. 5A to lower the resistance component of the optical switching element, thereby increasing applied voltage to the display layer so that the applied voltage to the R layer exceeds $V_{2th-R}$ and the R layer is in the on-state (red) of display. FIG. 5C shows the condition where light of a larger amount $L_2$ is radiated so that the optical switching element is further reduced in resistance to increase voltage applied to the display element, and the substantial applied voltage exceeds the $V_{2th-B}$ of the B layer due to superposition of bias component caused by stored charges due to asymmetric property to put the R layer and the B layer in the on-state (Magenta) of display.

Figure 5G:
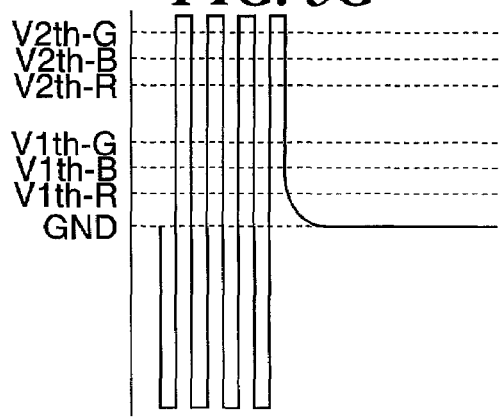
Figure 5D:
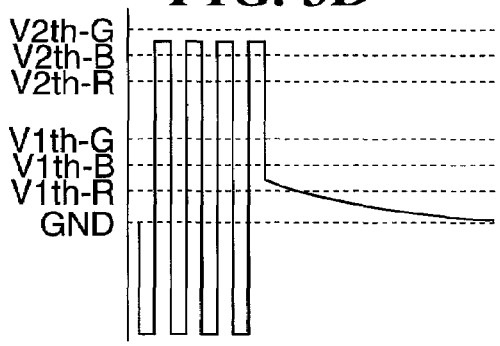

When the amount of light is further increased up to $L_3$ to increase the stored charges, and then the voltage is turned off, as shown in FIG. 5D, the voltage exceeding $V_{1th-R}$ is applied to the R layer by residual voltage based on the asymmetry of resistance component and the subsequent relaxation discharge, so that only the R layer is put in the off-state of display and only the B layer is displayed to be blue. Subsequently, in FIG. 5E, the applied voltage exceeds $V_{2th-G}$ which is the threshold of the G layer due to the amount $L_4$ of light, so the G+B layer is put in the on-state (Cyan) of display. In FIG. 5F, though the applied voltage exceeds $V_{2th-G}$ which is the threshold of the G layer due to the amount $L_5$ of light, the stored charges are increased, and when the voltage is turned off in such a condition, only the B layer is erased for the same reason as described above and only the G layer is displayed (green). As shown in FIG. 5G, when the amount of light is further increased ($L_6$), the resistance of the optical switching element has a small time constant to the display element and remarkably low resistance state is brought, so that the charge storage discharge effect disappears while the applied voltage becomes high to put three layers in the on-sate (white) of display.

Thus, seven colors may be displayed. Of course, some, if not all, of the conditions may be selected, and further one yellow layer may be provided to enable eight-color display. In the above description, the capacity and resistance of the respective layers are set equal for convenience. If these are different, the applied voltage is divided according to the capacity and resistance, so that colors are not always developed in order corresponding to the thresholds.

In the case where the threshold and the time constant or the change of phase are controlled by the steepness of voltage off state after the voltage is applied, it is necessary that at least one or more of characteristics of a laminated display element are different. In the case where all are the same, color display control is not conducted. In the liquid crystal display element, however, the threshold characteristic, the time constant and the like can be easily set to desired values by conditioning the liquid crystal material.

In the color display, a transparent protective layer, or a light modulating layer (layer formed by dispersing a black pigment in a polyvinyl alcohol resin) for controlling the amount of light is provided between the respective layers, for example, between a display element layer and an optical switching element, or a functional layer for preventing entering of oxygen or water may be provided between a substrate and a transparent electrode layer. Of course, it is possible to further provide a layer for securing adhesive force or correcting a warp.

A photo addressable recording medium used in the recording method of the invention will now be described. The photo addressable recording medium is formed by electrically connecting an optical switching element, the resistance component of which is controlled according to the direction of applied voltage and a display element to each other.

First, the optical switching element will be described.

As an optical switching element, the asymmetric rate of which is controlled by controlling the amount of light, any element may be applied as long as the element is different in resistance component depending on the direction of applied voltage and also the resistance component thereof is controllable.

The optical switching element at least includes a light transmitting substrate, a light transmitting conductive layer (electrode layer), and a photoconductive layer. As an inorganic optical switching element having a photoconductive layer made of inorganic material, for example, a-Si is used as an inorganic photoconductive layer. In the case of using a-Si, a structure of two or more layers, in which the kind of P-type or N-type element doped in the Si film by CVD or the dope amount thereof is varied between the display element side and the light incident side, is provided so that the asymmetric rate of resistance component may be controlled by controlling the amount of light during light irradiation. For example, cited is an element, the symmetric property of which is controlled by controlling the amount of doping gas at the time of manufacturing P-type and I-type in a structure where a P-type s-Si layer/an I-type a-Si layer/an N-type a-Si layer/an I-type a-Si layer/a P-type a-Si layer are sequentially stacked on a glass substrate. In the case of a-Si element, however, generally a heating process is provided in the manufacturing process, so it is necessary that the as substrate to be used is a substrate having high heat resistance such as a glass substrate.

The basic configuration of an organic optical switching element having a photoconductive layer made of organic material to be used preferably includes at least a light transmitting substrate, a light transmitting conductive layer (electrode layer), a charge generating layer and a charge transport layer. As the organic optical switching element, cited are the element of a functional separation type two-layer structure in which a charge generating layer (CGL) and a charge transport layer (CTL) are provided in order on a substrate on which a conductive layer is provided, and the element of a functional separation type three-layer structure in which a charge generating layer (CGL), a charge transport layer (CTL) and a charge generating layer (CGL) are similarly provided in order on a substrate.

Figure 6A:
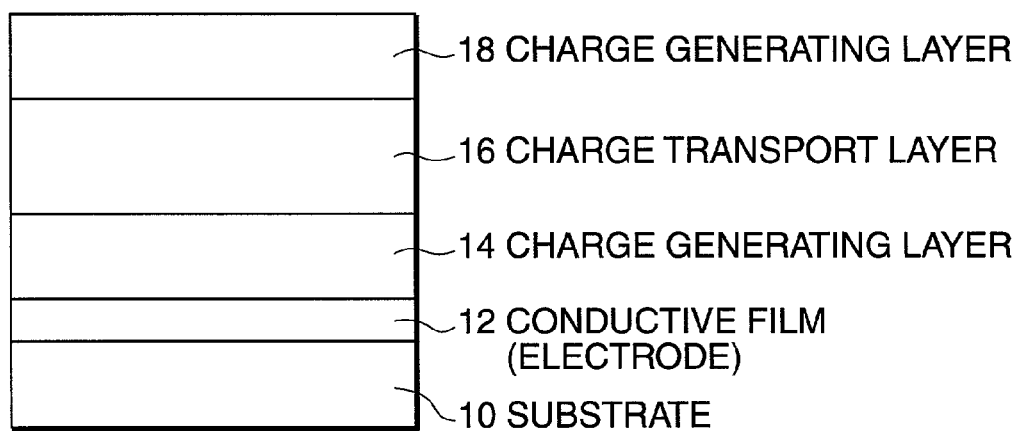
FIGS. 6A and 6B are diagrams showing the structure of an optical switching element.
Figure 6B:
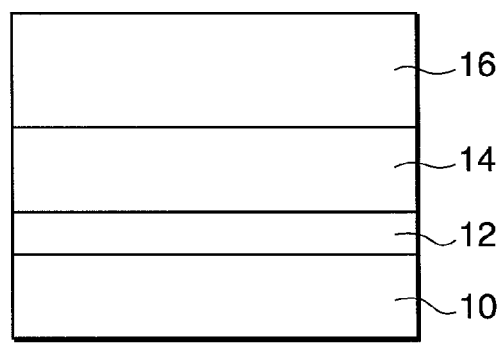

As an example, FIG. 6A shows an optical switching element of a functional separation type three-layer structure, and FIG. 6B shows the element of a functional separation type two-layer structure. In FIGS. 6A and 6B, the reference numeral 10 designates a light transmitting substrate, 12 a light transmitting conductive film (electrode), 14 a charge generating layer, 16 a charge transport layer, and 18 a charge generating layer, respectively.

The optical switching element structure in which a charge generating layer, a charge transport layer and a charge generating layer are stacked in order as shown in FIG. 6A is especially preferable. As shown in FIG. 7, in the optical switching element of this structure, during light irradiation, charges are generated in the upper and lower charge generating layers, and these charges can flow as an optical current through the charge transport layer according to the direction of applying voltage. Accordingly, in this structure, an optical current can be flowed regardless of applied polarity, so that the asymmetric property can be controlled and the resistance component itself can be controlled by amount of light. Thus, high-sensitivity recording may be performed both in the negative recording mode and in the positive recording mode. Though the film thickness of upper and lower charge generating layers, manufacturing conditions and material may be controlled to determine the asymmetric rate of such a medium, the charge generating layer on the substrate side and the charge generating layer on the charge transport layer are different in backing, so that there is a difference in characteristic, which becomes a parameter of an asymmetric property.

In the optical switching element of a functional separation type two-layer structure shown in FIG. 6B, a charge generating layer CGL and a charge transport layer CTL are manufactured in order on a substrate. Charges generated by light irradiation flow through the charge transport layer to the opposite side to generate an optical current. Normally, the charge transport layer transports positive charges only. Of course, some transport negative charges, and the others transport both positive and negative charges, but they have a problem in sensitivity or safety, so they are not applied.

FIG. 8 shows the flow of an optical current in the case of applying light to the optical switching element shown in FIG. 6B. As apparent from FIG. 8, the optical current is generated only for the polarity for positive charges to flow from the charge generating layer CGL side to the charge transport layer CTL side. In the case where the charges of the reverse polarity are applied, the positive charges cannot be injected, so that no optical current flows except a slight dark current. In such a polarity that an optical current flows, when the amount of light is increased, an optical current flows so that the resistance component is lowered, and on the other hand, in the reverse direction, no optical current flows so that the resistance component is high resistance, and substantially constant. Thus, the asymmetric rate can be controlled by controlling the amount of light, but it is difficult to control the resistance value in the direction where no optical current flows, so the control using a decrease in resistance has a narrow margin.

As material used in the charge generating layer for use in the optical switching element of the functional separation type two-layer or three-layer structure, advantageously used are organic materials caused to generate charges by light irradiation such as perylene family, phthalocyanine family, bis-azo family, dithioketopyrrole family, squarylium family, azulenium family, thiapyrylium polycarbonate family.

As the manufacturing method for the charge generating layer, in addition to dry film formation methods such as a vacuum deposition method and a sputtering method, a spin coat method using a solution or a disperse liquid and a dip method may be applied. All methods dispense with a substrate heating process and strict process management as in a-Si and photo diode manufacturing.

It is proper that the film thickness of the charge generating layer is 10 nm to 1 µm, preferably 20 nm to 500 nm. When it is less than 10 nm, the light sensitivity is insufficient, and it is difficult to manufacture a uniform film, and when it is above 1 µm, the light sensitivity is saturated and separation is liable to occur due to intrafilm stress.

As the material used in the charge transport layer, applicable are trinitrofluorene family, polyvinyl carbazole family, oxadiazole family, pylazoline family, hydrazone family, stilbene family, triphenylamine family, triphenylmethane family, diamine family and the like. Further, ion conductive materials such as polyvinylalcohol to which $LiClO_4$ is added, and polyethylene oxide are also applicable. Among the above, diamine family is preferably used in view of sensitivity and carrier transport capability.

As the manufacturing method for the charge transport layer, in addition to dry film formation methods such as vacuum deposition method and a sputtering method, a spin coat method using a solution or a disperse liquid, a dip method and the like may be applied.

It is proper that the film thickness of the charge transport layer is 0.1 µm to 100 µm, preferably 1 µm to 10 µm. When it is less than 0.1 µm, the withstand voltage becomes lower so that it is difficult to secure reliability, and on the other hand, when it is above 100 µm, impedance matching to the functional element becomes difficult so that design is difficult. Therefore, the thickness within the above range is desirable.

As the substrate of the optical switching element, used is a substrate made of glass, PET (polyethylene terephthalate), PC (polycarbonate), polyethylene, polystyrene, polyimide, PES (polyether sulfone) or the like. In the case of using s-Si as a photoconductive layer, high-temperature heat treatment is needed, so it is necessary to select a substrate which withstands the treatment temperature, for example, a substrate made of glass or the like. In the case of using organic material as a photoconductive layer (charge generating layer, charge transport layer), since high-temperature heat treatment is not done, it is advantageous to use a light transmitting plastic substrate in that a flexible substrate is obtained and forming is easy as well as in terms of cost. Generally, the thickness of the substrate is preferably 100 µm to 500 µm.

As a light transmitting electrode layer in the invention, ITO film, Au, $SnO_2$, Al, Cu and the like are used.

As disclosed in Japanese Patent Laid-Open Publication No. 2001-100664, in the case where the display element of the photo addressable recording medium has memory property and it is a display element which has selective reflectivity to selectively reflect wavelength required for display or backward scattering property, writing from the display side is possible, so in this case, it will be sufficient that at least the display element side substrate and the electrode layer are light transmissible. Accordingly, in the case of recording from the display element side, the substrate or the electrode layer of the optical switching element should not always be light transmissible, and an Al layer may be used as the electrode layer.

It is possible to form a functional layer to be mentioned later in the optical switching element of the invention. For example, it is also possible to form a layer for preventing carrier from rushing into between the electrode and the charge generating layer. Further, it is also possible to form a reflecting film or a shading film, and a functional layer having these plural functions may be formed. Such a functional layer is applicable as far as it does not remarkably obstruct the flow of an electric current.

The organic optical switching element dispenses with a special heating process unlike an inorganic optical switching element, so it is an effective element especially in respect of productivity. Further, not only the above two-layer structure and the three-layer structure but a multi-layer structure such as a charge generating layer/a charge transport layer/a charge generating layer/a charge transport layer/a charge generating layer may be adopted. The controllable symmetric property can be controlled by the film thickness, material and manufacturing method of the charge generating layer.

The display element of the photo addressable recording medium will now be described. As the display element applied to the invention, a display element which has the threshold changing in phase and memory property can be applied. Especially a display element having two or more thresholds changing in phase is effective. The reason is that the threshold of the high voltage side may be controlled by the applied voltage amount and the threshold of the low voltage side may be controlled by the charge storage discharge effect. Further, an element which may control the display by voltage drop at the time of turning off the voltage is especially effective. The steepness can be controlled by the charge storage discharge effect. Further, an element of which the display characteristic corresponds to the product of the applied voltage and the application time is applicable.

As the display element having memory property, applicable are liquid crystal display elements such as nematic liquid crystal which is dispersed in polymer to have a memory property, cholesteric liquid crystal, ferroelectric liquid crystal and elements formed by high-polymer dispersing these or encapsulating the same, or an element formed by encapsulating a field rotary element, a toner display element, an electrophoretic element or the like.

Further, especially applicable are an element having two or more thresholds, an element which may control the display by voltage drop at the time of turning off the voltage, and an element, the threshold characteristic of which is Vt product, that is, which has a threshold to the product of the applied voltage and the application time.

Since the display control depends on the charge storage discharge effect, it is desirable that the time constant of the display element is large, and normally the time constant desirably ranges from about 10 ms to 10 sec.

The display element has a light transmitting substrate and a light transmitting conductive layer (electrode layer). The substrate and the conductive layer to be used are the same as those in the optical switching element.

As the photo addressable medium applied to the recording method of the invention, a protective transparent film may be provided between a liquid crystal layer which is a display element and an optical functional element. Further, a light modulating film for controlling the sensitivity may be provided, and further a gas barrier layer for inhibiting entering of oxygen or water may be provided. Further, a functional film having plural functions of the above may be provided.

Figure 9A:
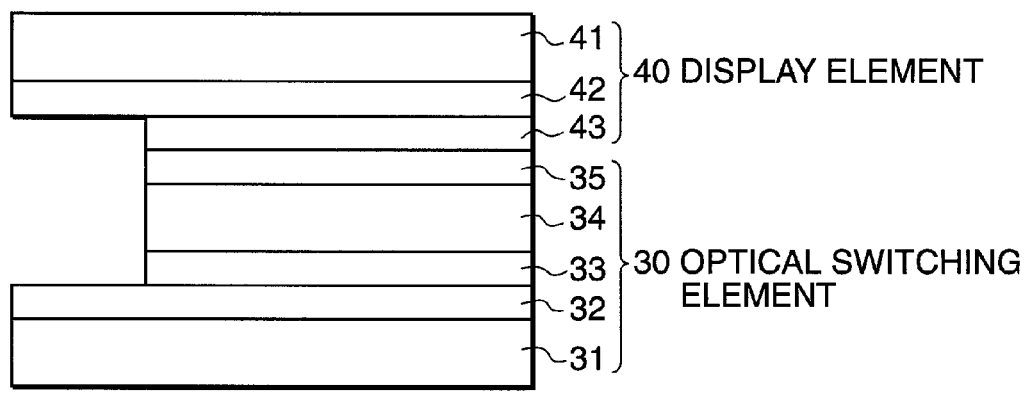
FIGS. 9A and 9B show photo addressable recording medium of the present invention.
Figure 9B:
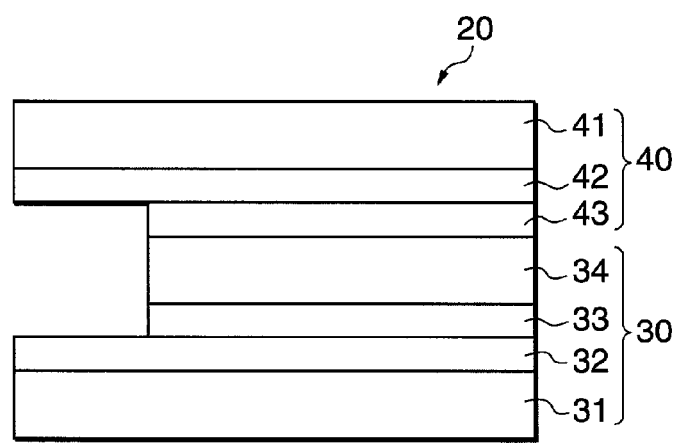

FIGS. 9A and 9B show an example of a photo addressable recording medium used in the invention. FIG. 9A shows a photo addressable recording medium using the optical switching element shown in FIG. 6A, and FIG. 9B shows a photo addressable recording medium used in the optical switching element shown in FIG. 6B. In FIGS. 9A and 9B, the reference numeral 20 designates a photo addressable recording medium, 30 an optical switching element, 40 a display element, 31 a transparent substrate, 32 a transparent electrode, 33 a charge generating layer, 34 a charge transport layer, 35 a charge generating layer, 41 a transparent substrate, 42 a transparent electrode, and 43 a liquid crystal layer, respectively.

According to the recording method of the invention, an alternating electric field is applied between the display element and the conductive layer of the optical switching element to be driven, recording is performed to the photo addressable recording medium, and as described above, the ratio of resistance component of the optical switching element is controlled to control the storage amount of charges to the display layer, thereby performing display. First, the method of driving the photo addressable recording medium will be described.

Figure 10A:
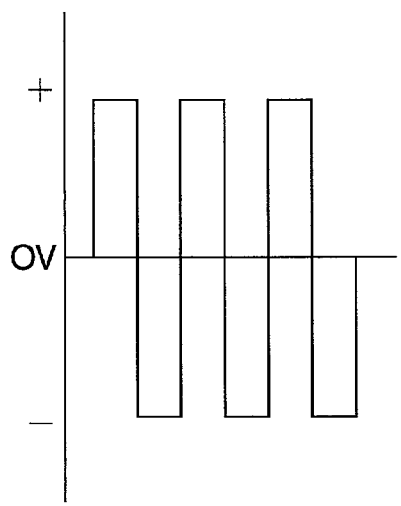
FIGS. 10A and 10B are diagrams showing an example of waveform of a driving pulse used in the present invention.
Figure 10B:
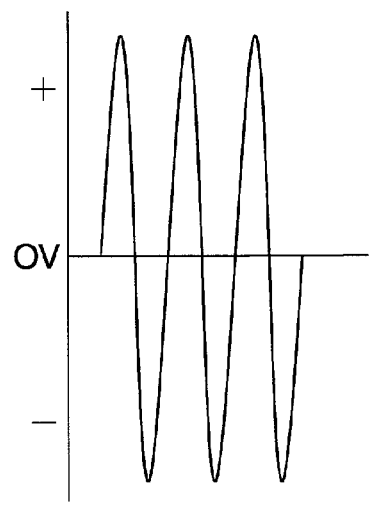

As described in FIG. 10, as a pulse for driving the photo addressable recording medium, the drive by rectangular wave is possible (See FIG. 10A), and the drive by sine wave is also possible (See FIG. 10B). Further, a triangular wave may be adopted. The rectangular pulse drive has high power and is an effective voltage applying waveform, but the circuit configuration is complicated so that it is hard to make a low-cost pulse circuit. On the contrary, in the case of sine wave, the voltage is simply raised by a step-up transformer, so that a driving power supply can be manufactured at low cost. Especially, in the case where the driving frequency is set equal to or higher than 500 Hz, desirably 1 KHz to 40 KHz, voltage rising is achieved with a small number of turns, and also power loss due to transformer is little, so that a compact, low-cost driving power supply can be manufactured, so it is very effective.

Figure 11:
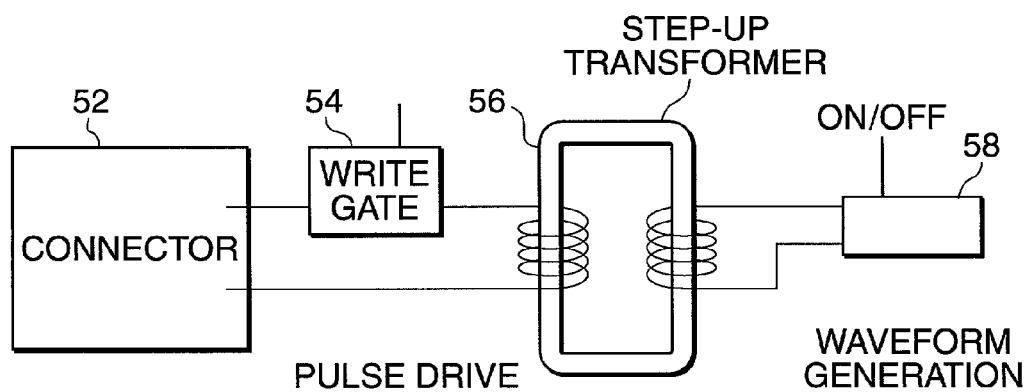
FIG. 11 is a conceptual drawing of a recording device for a recording medium using high-frequency sinusoidal wave in the recording waveform.

FIG. 11 shows an example of a conceptual drawing of a recording device for a recording medium using a high-frequency sinusoidal waveform. In the drawing, the reference numeral 52 designates a connector, 54 a write gate, 56 a step-up transformer, and 58 a high frequency sinusoidal waveform generating circuit.

As a drive pulse, applicable are a positive pulse, a negative pulse or a combination pulse of a positive pulse and a negative pulse. The drive pulses are, as shown in FIG. 10, a first pulse, a second pulse and the like sequentially applied for a desired number. The positive pulse means that the transparent electrode on the light input side is at high potential to the display side transparent electrode, and the negative pulse means the reverse.

As described above, the sinusoidal wave drive at 500 Hz or more costs low and is effective. Of course, the combination of these waves and a quite arbitrary waveform are applicable. Independently, a sub-pulse which cannot switch the display may be added to the drive pulse for improvement in display performance or the like.

The recording to the photo addressable recording medium is performed by applying pattern-like light to the light incidence side of the photo addressable recording medium. To generate a pattern of light, light transmitting displays such as a liquid crystal display using TFT, a simple matrix type liquid crystal display are applied. Any lighting devices which may irradiate the photo addressable recording medium such as a fluorescent light, a halogen lamp, electro luminescence (EL) light may be used for light irradiation. Of course, a light source is not limited to white light, and a filter may be used to generate color light.

It is possible to perform pattern generation and light irradiation jointly, and it goes without saying that EL display having a function of both pattern generation and light irradiation, and a light emission type display such as CRT, a field emission display (FED) are applicable. Further, recording may be performed by a communicating unit.

Figure 12:
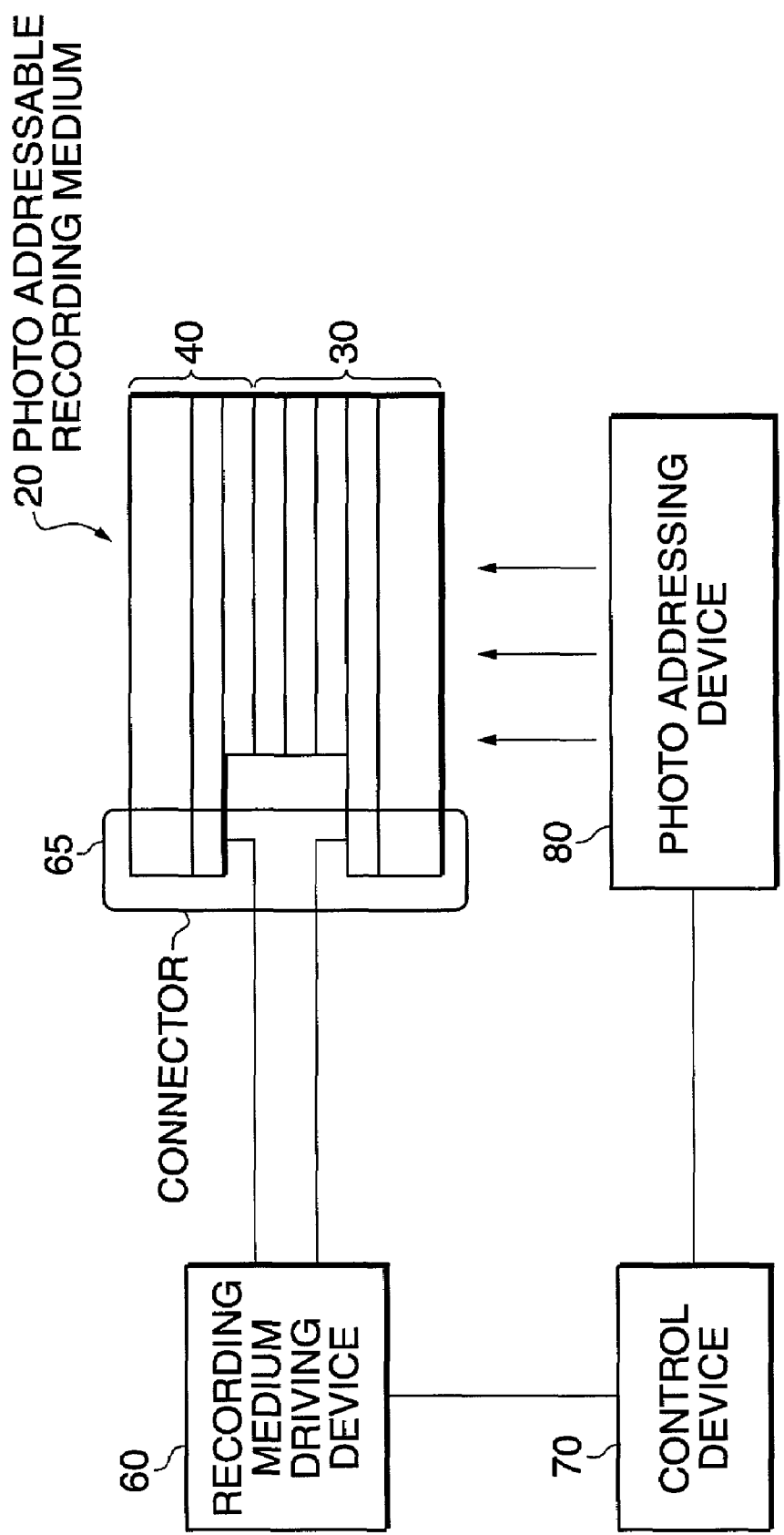
FIG. 12 is a conceptual drawing showing an example of a recording device according to the present invention.

A recording device for implementing the recording method of the invention will be described. FIG. 12 is a conceptual drawing showing an example of a recording device, a photo addressable recording medium 20 is the same as that in FIG. 9, and the recording medium may be fixed to the recording device to constitute a display device or the recording medium may be removably provided to form a recording device. In FIG. 12, the reference numeral 60 designates a photo addressable recording medium driving device, 70 a control device, and 80 a photo addressing device, respectively. The photo addressing device 80 used is formed by combination of a halogen light source and a light transmission type TFT liquid crystal. The reference numeral 65 designates a connector.

Figure 13:
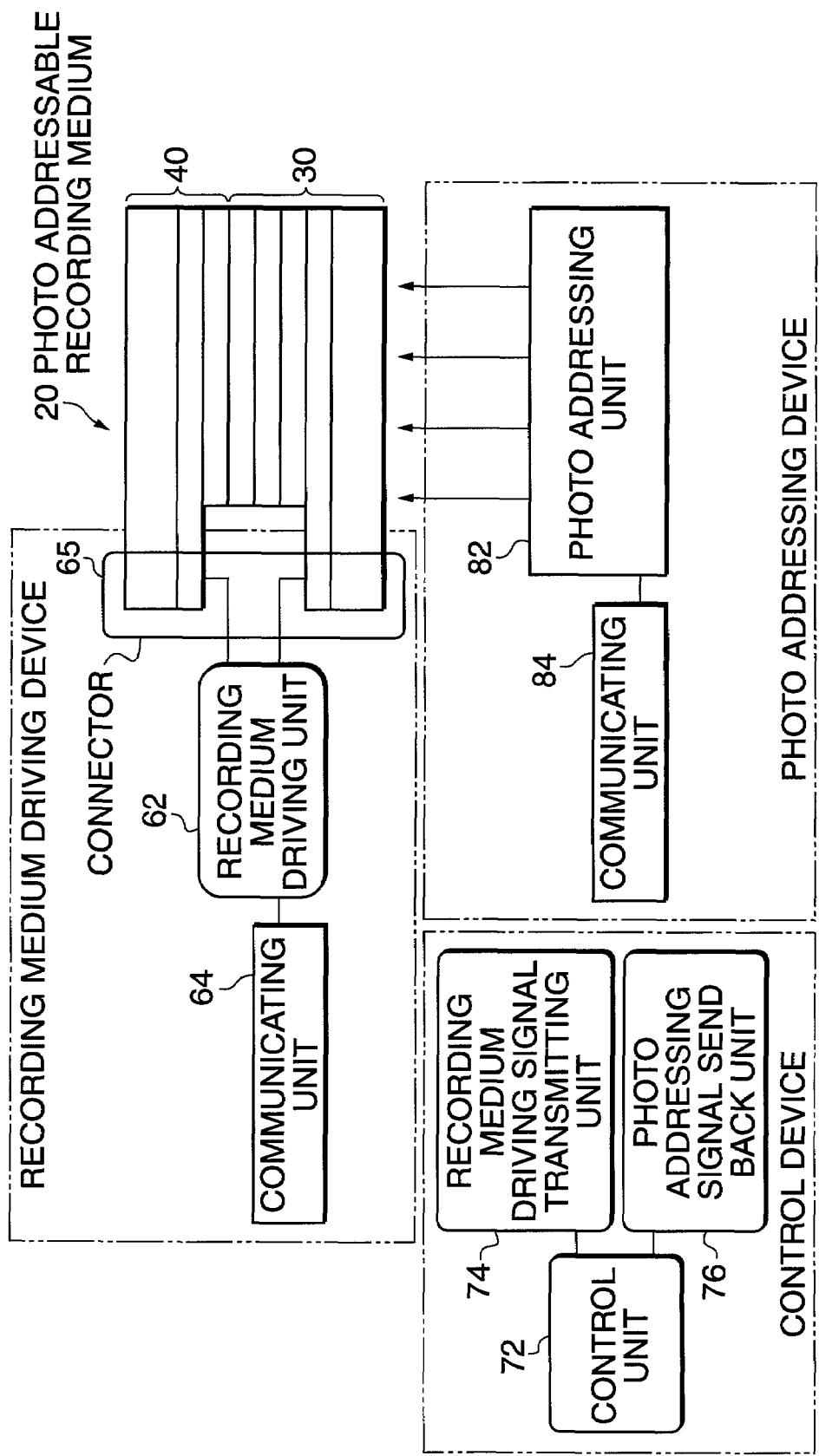
FIG. 13 is a conceptual drawing showing another example of a recording device according to the present invention.

As shown in FIG. 13, the photo addressable recording medium driving device, the control device and the photo addressing device are not integrated, but a communicating unit or a transmitting unit may be provided on these devices to input a medium driving signal or a photo addressing signal by transmission. The reference numeral 62 designates a recording medium driving unit, 72 a control unit, 74 a recording medium driving signal send back unit, 76 a photo addressing signal send back unit, 82 a photo addressing unit, and 64 and 84 designate communicating units.

The recording medium driving device 60 includes a voltage applying unit, a signal receiving unit (not shown) and further the connector 65. The voltage applying unit applies a drive pulse to a connected photo addressable recording medium. The device includes a unit that generates an applied pulse and a unit that detects a trigger signal for outputting the drive waveform. The pulse generating unit is provided with a waveform storing unit such as ROM, a DA converting unit and a control unit. Though applicable are a unit that D-A converts a waveform read from the ROM at the time of applying voltage to be applied to the medium and a unit that generates a pulse by an electric circuit system like a pulse generating circuit instead of ROM, a system in which a sine waveform is made from a resonance circuit or the like and increased in voltage by the step-up transformer to form a drive pulse is very effective for manufacturing a low-cost device because the circuit is inexpensive, and in addition, any unit that applies a drive unit will do. Especially in the case where high frequency equal to higher than 500 Hz is applied, the step-up transformer may also be manufactured at low cost, so the above system is very effective.

A signal is sent by wire or radio from an input unit or a photo addressing unit. In the case of wire, it is electrical, but in the case of radio, an infrared ray or an ultrasonic as well as an electromagnetic wave will do.

The connector 65 for connection to upper and lower electrodes of the photo addressable medium is a connector for connecting a transparent electrode formed by a light incident substrate and a transparent electrode formed by a display side substrate to each other, which has contacts on the respective sides. They may be freely removed.

The photo addressing device 80 includes a unit that generates a pattern of light radiated to the light incident side of a medium, a light radiating unit that radiates the pattern to the medium, a control unit and a communicating unit. For generation of a pattern, applicable are light transmission type displays such as a liquid crystal display using TFT and a simple matrix type liquid crystal display. As the light radiating unit, any lighting unit capable of radiating light to the medium such as a fluorescent light, a halogen lamp and an electro luminescence (EL) light will be applicable. Further, as a matter of course, an EL display serving both as a pattern generating unit and a light radiating unit, and light emission type displays such as CRT and a field emission display (FED) are applicable. In addition to the above, the other units capable of controlling an amount of light applied to the photo addressable medium, wavelength and an irradiation pattern will do. Of course, the light source is not limited to white light and a filter may be used to generate color light.

The control device 70 includes at least a photo addressing signal output unit that outputs a signal for selecting an image to be recorded by a user to the photo addressing device, a driving signal send back unit that transmits a driving signal for recording a selected image to the photo addressable medium to a medium driving device and a control unit. Of course, the device may be provided as a switch on the photo addressing device or the medium driving device, or the starting user may keep the wire as an input device by hand, and a communicating unit may be wire, radio, infrared ray or ultrasonic.

As the recording system, though the writing unit, the medium driving unit and the input unit may be provided in the same device, the medium driving unit and a set of the input unit and the photo addressing unit may be formed as separate devices to perform recording by the communicating unit, or the medium driving unit, the photo addressing unit and the input unit may be formed as separate devices to perform recording by the communicating unit. The above combination is not restrictive, but if only the communicating unit is provided, the units may be combined according to the intended use.

The recording method of the invention is a recording method in which rewriting on a recording medium is performed, and favorable display on-off operation is performed even with a small amount of light to attain high sensitivity, and further the drive is enabled by alternating voltage with frequency equal to or higher than 500 Hz to use a compact, low-cost power supply. Further, color display is made by the recording method of the invention.

Prior to the embodiment, to confirm the effect, as in the following, the optical switching element and the display element are separately manufactured, the elements are connected in series, and the driving voltage is applied thereto to confirm the effect of the asymmetric rate of the optical switching element and the controllability of light amount control by observing the waveform of the display element and measuring the reflectivity. In the following, "part", "%" and the like are based on the weight.

EXPERIMENT 1

[Manufacture of Optical Switching Element]

On a PES film substrate with an ITO electrode, benzimidazole perylene (hereinafter referred to as "BZP") is formed 0.08 μm thick as a charge generating layer by vapor deposition, and secondly, as a charge transport layer, 10% monochlorbenzene solution of a charge transport layer material made by mixing 40% 3-3'-dimethyl-N,N'-bis(4-ethyl phenyl)-N,N'-bis (4-methyl phenyl)-[1,1'-biphenyl]-4,4'-diamine (hereinafter referred to as "biphenyl-diamine family material") and 60% poly (4,4'-cyclohexylidene diphenylene carbonate (hereinafter referred to as "polycarbonate bisphenol Z") is formed into a film 3 μm thick by a dip method. Further, on the charge transport layer, BZP is formed 0.08 μm thick by vapor deposition. By these processes, an optical switching element is manufactured. An Au electrode with a thickness of 50 Å is formed on the surface of the charge generating layer of the optical switching element (hereinafter sometimes referred to as "optical switching cell (3-layer structure)").

An optical switching cell (2-layer structure) is manufactured similarly except that the photoconductive layer formed of three layers is altered to a photoconductive layer formed of two layers: a charge generating layer and a charge transport layer.

<Confirmation on Asymmetric Property of Optical Switching Element>

Figure 14A:
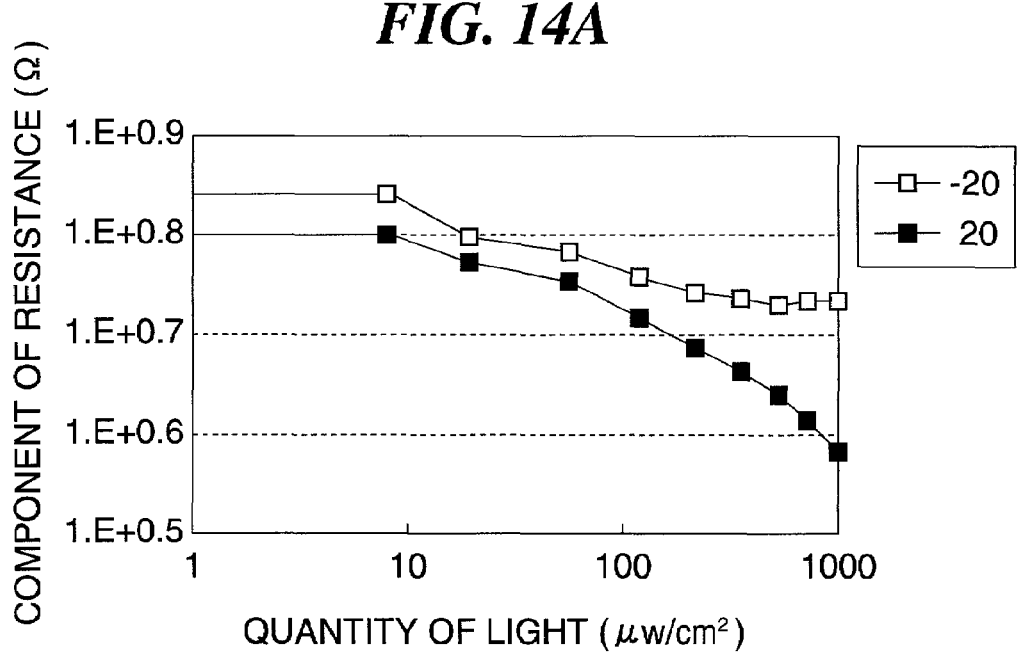
FIGS. 14A and 14B show the resistance component and asymmetric rate, respectively, in the case of applying light to the optical switching element of a three-layer structure.

We have made a measurement for confirming that the asymmetric rate of the manufactured optical switching cell (3-layer structure) is controlled by the amount of light radiated. When bias voltage of 20V is applied and a designated amount of light is applied by a halogen light source, the resistance component is measured. Concerning the resistance component, the asymmetric rate depending on polarity of bias application is measured by an impedance analyzer. FIG. 14A shows the impedance in each polarity, and FIG. 14B shows the ratio (ratio of resistance component, that is, asymmetric rate).

Figure 14B:
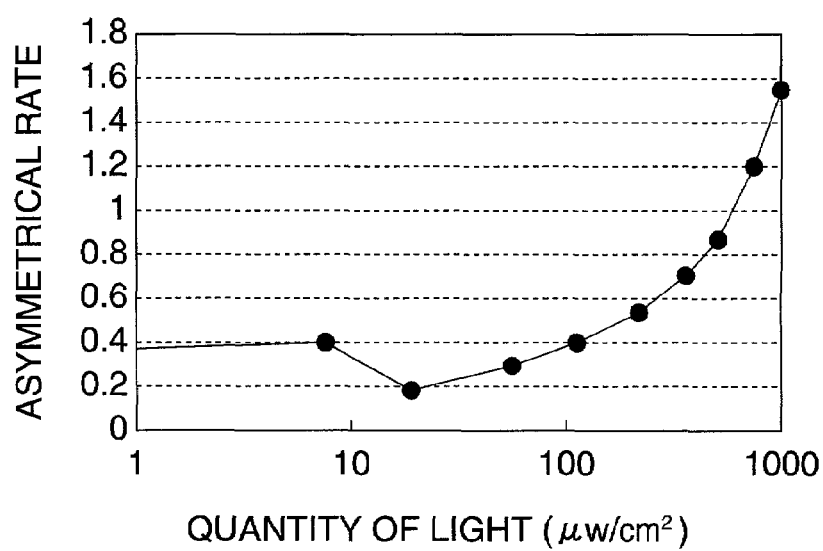

As apparent from FIG. 14B, the more the amount of light is increased, the higher the asymmetric rate is, and it is shown that the asymmetric rate depending on the polarity of the optical switching element may be controlled by the amount of light. FIG. 14A shows that the resistance component is decreased by light irradiation to either polarity of voltage application.

Figure 15A:
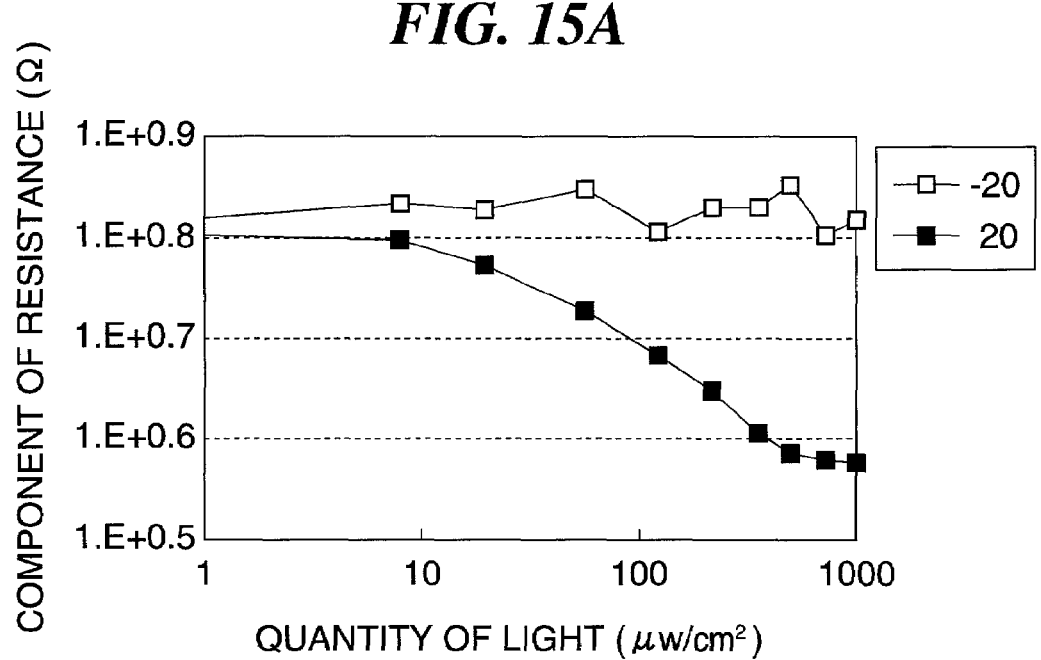
FIGS. 15A and 15B show the resistance component and the asymmetric rate, respectively, in the case of applying light to the optical switching element of a two-layer structure.
Figure 15B:
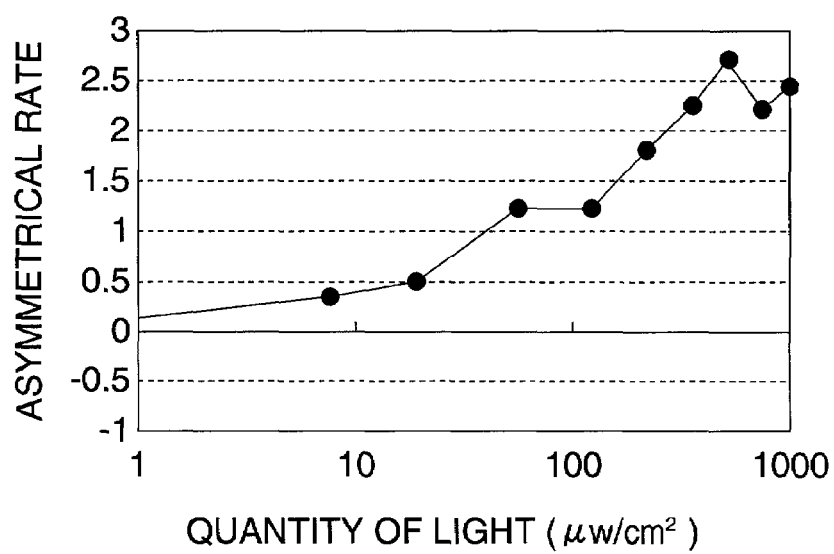

FIGS. 15A and 15B respectively show the results of measuring the impedance and the asymmetric rate in each polarity of an optical switching cell (2-layer structure) similarly to the case of a three-layer structure. Though the asymmetric rate of the optical switching element may be controlled by the amount of light, the resistance component is not varied depending on the amount of light in the direction where an optical current does not flow.

[Manufacture of Display Element]

The display element is manufactured as in the following. To 74.8 parts nematic liquid crystal E8 (manufactured by Merck Japan Inc.) having positive dielectric constant anisotropy, 21 parts chiral agent CB15 (manufactured by BDH Corp.) and 4.2 parts chiral agent R1011 (manufactured by Merck Japan Inc.) are added to be heated and molten, and then restored to a room temperature to obtain a chiral nematic liquid crystal which selectively reflects color light of blue green.

To 10 parts blue green chiral nematic liquid crystal, 3 parts addition product (D-110N manufactured by Takeda Chemical Industries, Ltd.) of 3 mol xylene di-isocyanate and 1 mol trimethylolpropane, and 100 parts ethyl acetate are added to form a uniform solution, from which a liquid having oil phase is prepared.

On the other hand, 10 parts polyvinyl alcohol (Poval 217EE, manufactured by Kuraray Co., Ltd.) is added to 1000 parts heated ion exchange water and stirred, and then shelf-cooled to prepare a liquid having water phase.

Subsequently, the oil phase is emulsified and dispersed in the water phase for one minute by a domestic mixer to which 30V AC is applied by a Slidac (transformer), to thereby prepare oil-in-water emulsion in which oil phase liquid drops are dispersed in the water phase. The oil-in-water emulsion is heated at 60° C. in a water bath and simultaneously stirred for two hours to complete interfacial polymerization, thereby forming a liquid crystal microcapsule. The mean particle diameter of the obtained liquid crystal microcapsule is estimated at about 12 μm by a laser particle size distribution meter.

The microcapsule disperse liquid is passed through a stainless mesh with a mesh 38 μm to be filtered and then left as it is for 24 hours, and milky supernatant is removed to obtain slurry with about 40 wt % solid matter formed by microcapsule.

A water solution of polyvinyl alcohol having 10 wt % polyvinyl alcohol is added to the slurry by such an amount that the solid matter of the polyvinyl alcohol water solution is ⅔ (by weight ratio) to the solid matter of slurry to prepare a liquid crystal coating liquid.

The above coating liquid is applied twice on the ITO surface of the PET film (Toray high beam) with ITO with a thickness of 125 μm by a wire bar #44, to thereby form a liquid crystal layer. In each application, the wire bar is accurately located so as to coincide with the positions of the projecting and recessed parts formed for application. In the surface of the obtained liquid crystal layer, many parallel grooves are formed corresponding to the wire pitch of the wire bar. The film thickness of the projecting part of the groove is about 36 μm, and the film thickness of the recessed part is about 22 μm. The coat is dried at a room temperature half a day, and then dried at 90° C. by an oven for 24 hours.

On the surface of another PET film (Toray high beam) with ITO with a thickness of 125 μm, DICK DRY WS-321A/LD-55 (manufactured by Dainippon Ink & Chemicals, Inc.) which is a complete water dry laminate adhesive is applied and dried to form an adhesive layer 4 μm thick. The adhesive layer and the liquid crystal layer are made closely contact with each other and laminated at 70° C. After that, black polyimide BKR-105 (manufactured by Nippon Kayaku Co., Ltd.) is applied to the surface of the substrate of one PET film to form a shielding film, to thereby obtain a display element formed of capsule liquid crystal.

The optical switching cell (3-layer structure) and the display element are connected in series (Au electrode of the optical switching cell and ITO of the shielding film side of the display element are connected to each other, and ITO of the switching cell and the other ITO of the display element are connected to each other). Negative recording is tested by the device thus constructed. In the display element, the first threshold $V_{1th}$ is 60V, and the second threshold $V_{2th}$ is 150V.

Figure 16A:
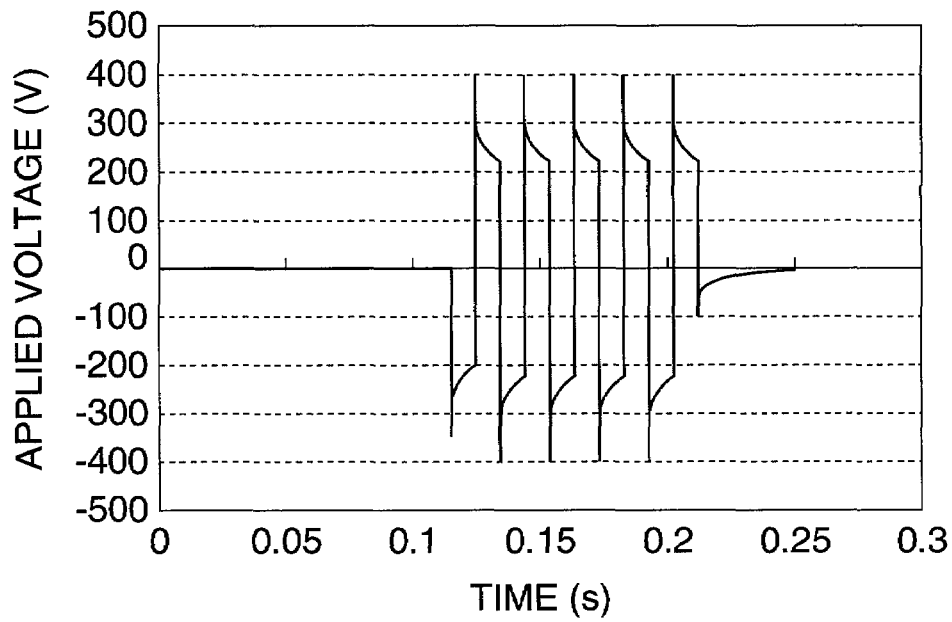
FIGS. 16A and 16B show the waveform of voltage applied to a display element when negative recording is performed in the experimental example 1.

A halogen light source is applied as an irradiation light source to the photo addressable recording medium to apply positive and negative rectangular pulses with 600 Vpp and 50 Hz. FIG. 16A shows the results of observing the voltage waveform applied to the display element when light is not applied (1 μm/cm$^2$ or less), and FIG. 16B shows the results of observing the voltage waveform when light (100 μW/cm$^2$) is applied.

Figure 16B:
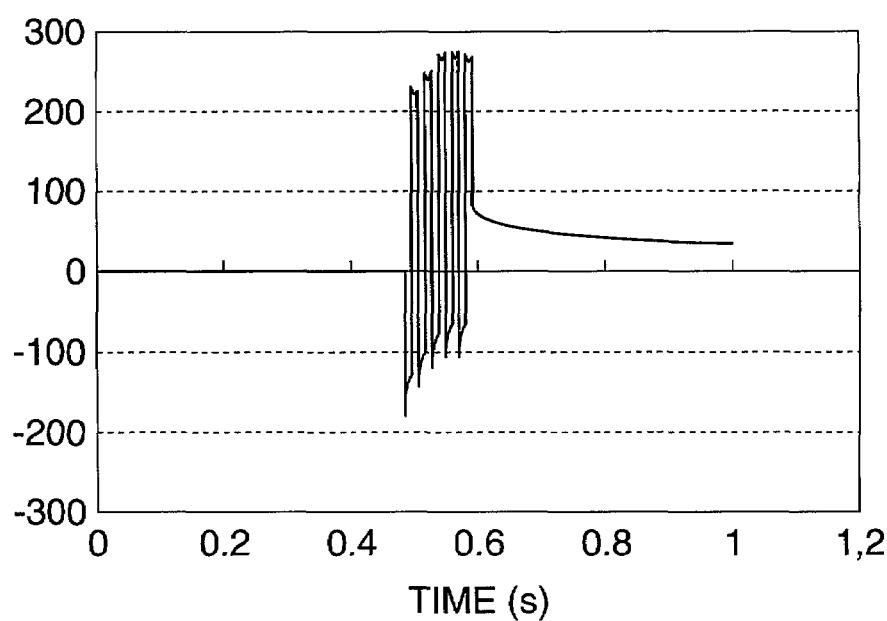

It is found that though the waveform (FIG. 16A) during non-irradiation is not dependent upon the direction of voltage application and is a good symmetrical waveform, it is put in the effective bias applied state by light irradiation (FIG. 16B). During light irradiation, recording is erased to be put in a low reflection state by waveform rounding due to relaxation discharge of stored charges from about 80V. On measuring the reflectivity at this time by X-Rite, reflectivity is 18% during non-irradiation, and 3% during light irradiation. As described above, it will be sufficient that the amount of light is 100 μW/cm$^2$, and high sensitivity is obtained.

Figure 17A:
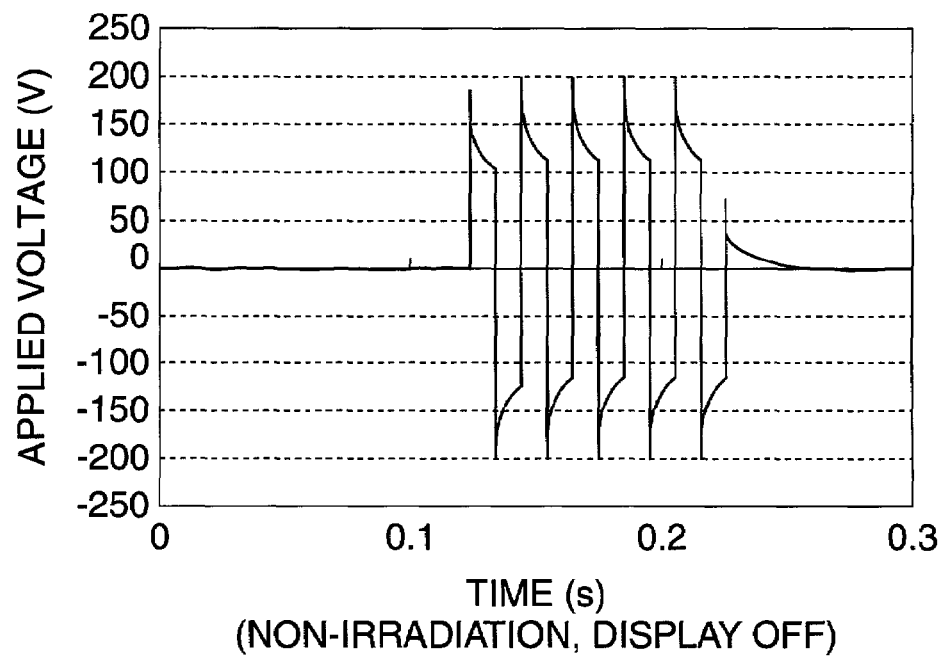
FIGS. 17A and 17B show the waveform of voltage applied to the display element when positive recording is performed in the experimental example 1.
Figure 17B:
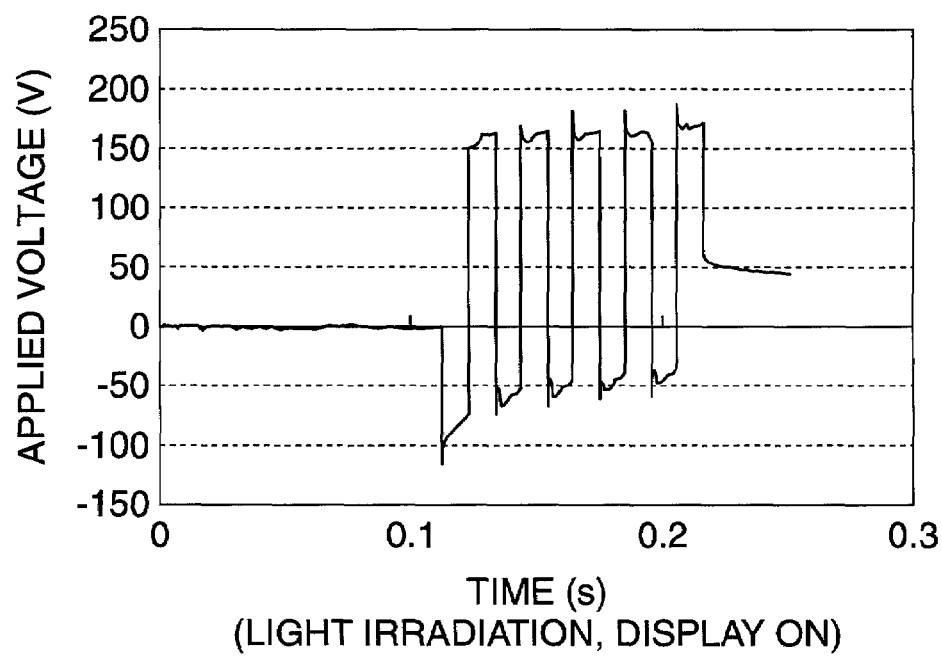

Positive recording was tested by the photo addressable recording medium. The results are shown in FIGS. 17A and 17B. In the drawings, the applied voltage is 350V, the amount of light is 100 μW/cm$^2$, and the applied voltage is set so that during non-irradiation, it is equal to or lower than the threshold, and the display is turned on. As shown in FIG. 17A, during non-irradiation, voltage of 150V or lower is applied to the display element, and as shown in FIG. 17B, after light irradiation, effective bias voltage due to an asymmetric property is applied so that the voltage is applied exceeding the threshold, and the reflectivity is in the on-state. Though release of stored charges about equal to the bias component is observed, such voltage hardly exerts any influence on the display characteristic. Also in this example, it will be sufficient that the amount of light is 100 μW/cm$^2$ and high sensitivity is obtained.

Figure 18A:
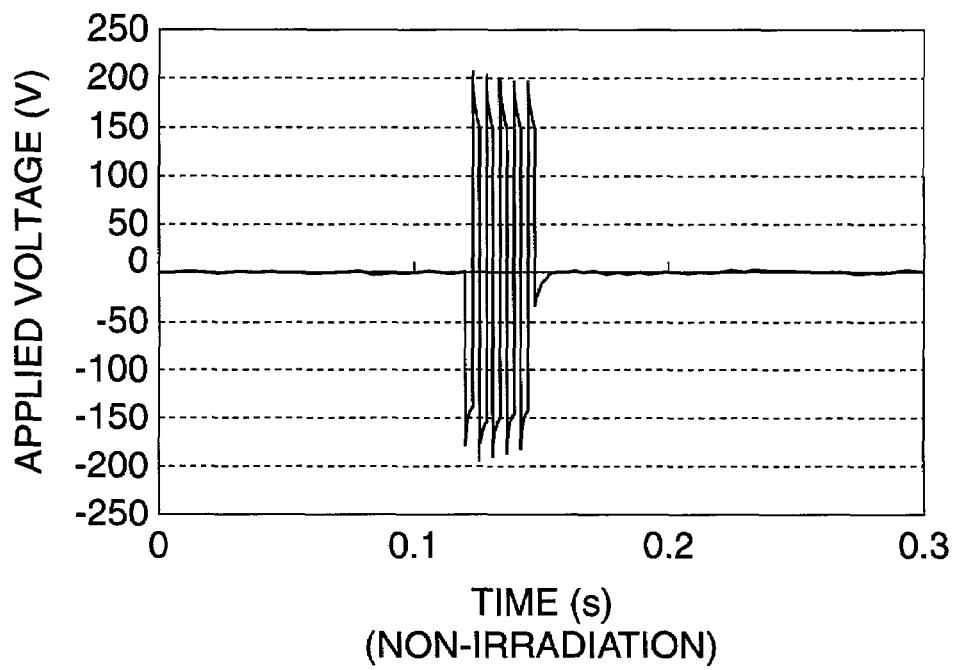
FIGS. 18A and 18B show the waveform of voltage applied to the display element when pulses at 1 KHz are applied for 100 ms in the experimental example 1.
Figure 18B:
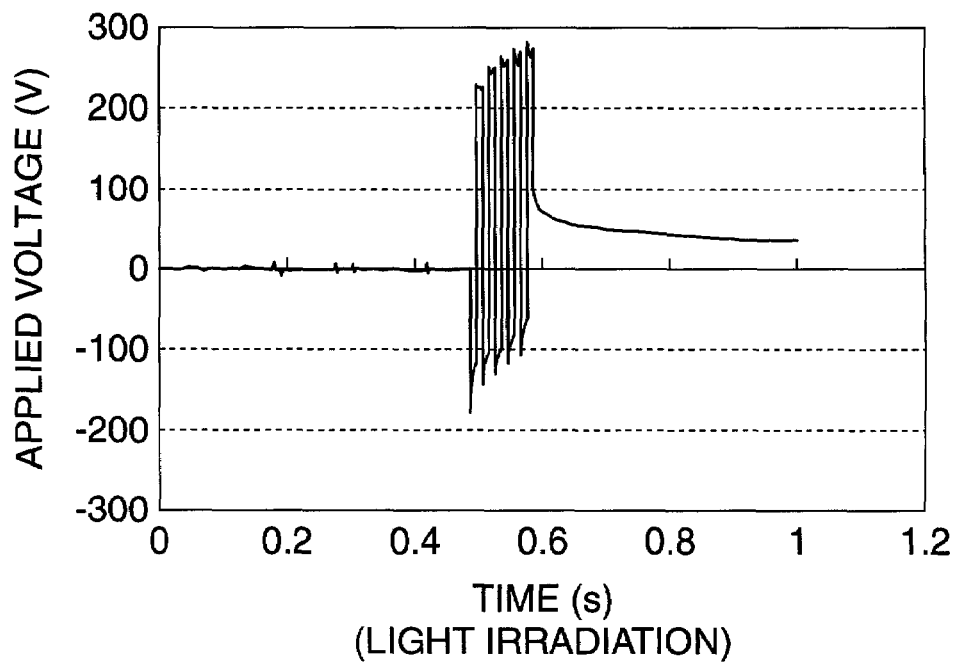

Further, to implement a low-cost recording device, sine wave pulses of 1 kHz are applied for 100 ms to test recording. During non-irradiation 1 μW/cm$^2$, and during irradiation 100 μW/cm$^2$, as shown in FIG. 18, the charge storage and its discharge profile to the display element is obtained. Confirmed is negative recording such that during non-irradiation, the display is in the on-state, and during non-irradiation, the display is in the off-state.

EXPERIMENTAL EXAMPLE 2 (CONTRASTING EXAMPLE)

The results in the case of using an optical switching element having a symmetrical resistance component in both cases of light irradiation and non-irradiation will now be shown.

[Optical Switching Element]

A single layer of Zn-phthalocyanine pigment is formed into a film 0.2 μm thick as a charge generating layer on PES film substrate with ITO electrode to manufacture Au electrode with a thickness of 50 Å. As this element has a single layer of a charge generating layer, there is no difference in resistance component of impedance due to direction of voltage application (the asymmetric rate during light irradiation and during non-irradiation is about 1).

[Display Element]

The same display element as that of the experimental example 1 is used.

The display element and the optical switching element are connected in series similarly to the above to observe the applied voltage and amount of light to the display element. Prior to this observation, as in the experimental example 1, the impedance of the optical switching element is measured.

It is confirmed that in both cases of light irradiation and non-irradiation, the resistance component is symmetrical between positive and negative, the asymmetric rate is about 1, and there is no bias application effect by charge storage.

When recording is performed similarly to the experimental example 1 by using the optical switching element, the amount of light equal to or larger than 500 μW/cm$^2$ is required for enabling display. It is found that there is no bias application effect by charge storage, and the applied voltage to the display element is increased only by a decrease in resistance of the optical switching element due to light irradiation to control the on-off state of display, so the amount of light is further required.

EXPERIMENTAL EXAMPLE 3

The color display control is tested. Three kinds of display cells different in selective reflection wavelength are manufactured, electrically connected in series and stacked vertically to form a structure for enabling confirmation of color display. The display element and the optical switching cell are connected in series, to which a driving pulse is applied, and controlled light irradiation is performed to confirm color display.

A first display cell is formed by making an ITO film with a thickness of 200 Å on a glass substrate, wet-spraying spherical spacer (HAYABEADS L-25, manufactured by Hayakawa Rubber Co. Ltd.) with a diameter of 5 μm, having an adhesive, and making the glass substrate with ITO closely adhere so that the ITO film is in contact with the spacer. The above processes are conducted at a room temperature, and then to make the spacer and the substrate closely adhere to each other, they are heated to 110° C., and held for 30 minutes to form a liquid crystal cell.

As liquid crystal, cholesteric liquid crystal for selectively reflecting color light of green is formed by mixing 72.3 wt % nematic liquid crystal E186(manufactured by Merck Japan Inc.) having positive dielectric constant anisotropy, 13.9 wt % dextrorotatory chiral agent CB15 (manufactured by Merck Japan Inc.) and 13.9 wt % dextrorotatory chiral agent CE2 (manufactured by Merck Japan Inc.) to be used. The liquid crystal is injected into the above cell to manufacture a display cell.

A second display cell is manufactured by injecting the following liquid crystal into a liquid cell of the same structure as that of the first liquid crystal cell.

As the cholesteric liquid crystal of a display layer for selectively reflecting color light of blue, the cholesteric liquid crystal constituting a display layer of blue is formed by mixing 73.0 wt % nematic liquid crystal (MLC2037 manufactured by Merck Japan Inc.), 22.5 wt % chiral agent 1 (CB15 manufactured by Merck Japan Inc.) and 4.5 wt % chiral agent 2 (R1011 manufactured by Merck Japan Inc.) to be used.

A third display cell is formed by manufacturing ITO film with a thickness of 200 Å on a glass substrate having a shielding film formed on the back, wet-spraying spherical spacer with a diameter of 5 μm (HAYABEADS L-25 manufactured by Hayakawa Rubber Co., Ltd.) having an adhesive thereon, and further making the glass substrate with ITO closely adhere so that the ITO film is in contact with the spacer. The above processes are conducted at a room temperature, and then to make the spacer and the substrate adhere to each other, they are heated to 110° C. and held for 30 minutes to form a liquid crystal cell.

As liquid crystal, as the cholesteric liquid crystal of a display layer for selectively reflecting color light of red, the cholesteric liquid crystal constituting a display layer of red is formed by mixing 78.4 wt % nematic liquid crystal (ZLI3806 manufactured by Merck Japan Inc.), 18.0 wt % chiral agent 1 (CB15 manufactured by Merck Japan Inc.) and 3.6 wt % chiral agent 2 (R1011 manufactured by Merck Japan Inc.) to be used. The liquid crystal is injected into the above cell to manufacture a display cell.

These liquid crystal layers are vertically stacked, with red placed at the lowermost layer, and ITO electrodes of the display cells are connected in series to form a display element.

The display element and the 3-layer optical switching cell used in the experimental example 1 are connected, 800V is applied, and simultaneously the controlled amount of light is radiated to make coloring. In the case of applying 1 $\mu W/cm^2$ as the amount of light, a red layer and a green layer are turned on to be displayed, thereby displaying yellow. When the amount of light of 36 $\mu W/cm^2$ is radiated, the display of the red layer is turned off by the charge storage discharge effect, thereby displaying green. When the amount of light of 73 $\mu W/cm^2$ is radiated, the display of green is turned off by the charge storage effect, and the display of a blue layer is turned on by the bias effect due to the charge storage effect. Thus, the display of yellow, green and blue is confirmed.

EMBODIMENTS

The invention will now be described in detail by embodiment, but the invention is not limited to the embodiments.

Embodiment 1

[Manufacture of Photo Addressable Recording Medium]

<Optical Switching Element>

Similarly to the above experimental example, a charge generating layer/a charge transport layer/a charge generating layer are provided on PES film substrate with ITO electrode, 5% polyvinyl alcohol water solution is applied 0.2 µm thick on the charge generating layer by spin coat method to form a separation layer, thereby forming an optical switching element.

<Display Element>

Similarly to the above experimental example 1, a coating liquid for a liquid crystal layer is prepared. This liquid is applied 125 µm thick on the ITO surface of PET film (Toray high beam) with ITO, and dried similarly to the experimental example 1 to form a liquid crystal layer.

<Photo Addressable Recording Medium>

DICK DY WS-321A/LD-55 (Dainippon Ink & Chemicals, Inc.), which is complete water dry laminate adhesive is applied on the PVA surface of the optical switching element and dried to form an adhesive layer 4 µm thick.

Further, black polyimide (BKR-105, manufactured by Nippon Kayaku Co., Ltd.) is applied to the surface of PET film of the display element.

The adhesive layer of the optical switching element and the liquid crystal layer of the display element are made to closely adhere to each other and laminated at 70° C. to obtain a monochromatic display photo addressable medium.

[Recording Method]

The recording device shown in FIG. 12 is used, and both ITO electrodes of the photo addressable recording medium are connected by a connector of the photo addressable medium driving device to drive the photo addressable recording medium. As driving pulses, positive and negative rectangular waves are applied by five pulses. The pulse duration is 100 ms both in positive and negative cases. The voltage of pulse is 600 Vpp, and an optical image with Max 100 $\mu W/cm^2$ by conversion of wavelength 550 nm is written to perform monochromatic color image display.

[Evaluation]

In the dark part and in the light irradiation part, a green image is obtained in the light irradiation part, and a black monochromatic image is obtained in the dark part. The influence of previously written image is not found, and hysteresis does not remain. Though recording is repeated 1000 times, lowering of display performance is not found and it is confirmed that the characteristic is stable.

Embodiment 2

Recording is performed by using a photo addressable recording medium similar to that of the embodiment 1, and using a device capable of applying sine wave of 1 kHz.

The driving pulses are similar to those of the embodiment 1 except that sine wave of 1 KHz is input by 100 pulses.

[Evaluation]

In the dark part and in the light irradiating part, a green image is obtained in the light irradiating part and a black monochromatic image is obtained in the dark part. The influence of a previously written image is not found, and hysteresis does not remain. Though recording is repeated 1000 times, lowering of display performance is not found, and it is confirmed that the characteristic is stable.

Embodiment 3

In this embodiment, color display is attempted. The liquid crystal used in the experimental example 3 is encapsulated similarly to the experimental example 1, and then the liquid crystal is stacked in three layers to form a display element. The display element is stuck to the same optical switching element as that of the embodiment 1 to manufacture a color display enable photo addressable recording medium. The voltage application is performed at 1000 Vpp with positive and negative rectangular waves of 10 Hz.

[Evaluation]

A pattern of light is applied to the photo addressable medium, and voltage is applied to attempt color image display. As a result, color images of blue, green and yellow are obtained. The influence of a previously written image is not found, and hysteresis does not remain. Though recording is repeated 1000 times, lowering of display performance is not found, and it is confirmed that the characteristic is stable.

COMPARATIVE EXAMPLE 1

In this example, an organic optical switching element having a single layer of a charge generating layer like the experimental example 2 is used.

On PES film substrate with ITO electrode, Zn-phthalocyanine pigment is mixed with polyvinyl butyral (50 wt %) and formed into a film 0.2 µm thick as a charge generating layer. On the charge generating layer, 5% polyvinyl alcohol water solution is provided 0.2 µm thick by spin coat method to form a separation layer, thereby forming an optical switching element.

The same display element as that of the embodiment 1 is stuck to the optical switching element to form a photo addressable recording medium.

The photo addressable recording medium is installed in the same recording device as that of the embodiment 1 and driven. As driving pulses, the positive and negative rectangular waves are applied by five pulses. The pulse duration is 100 ms both in negative and positive cases. The voltage of pulse is 600 Vpp, and an optical image with Max 100 μW/cm² by conversion of wavelength 550 nm is written and evaluated.

[Evaluation]

A pattern of light is applied to the photo addressable medium, and voltage is applied to attempt color image display. As a result, in the dark part and in the light irradiation part, a satisfactory image is not obtained. By radiating amount of light of 500 μW/cm², an image is barely displayed.

According to the recording method of the invention, a recording medium is rewritable, with a small amount of light, favorable display on-off operation is performed to attain high sensitivity, and the drive is done by alternating voltage with a frequency equal to or higher than 500 Hz so that a compact, low-cost power supply can be used. Further, color display is made by the recording method of the invention.

The entire disclosure of Japanese Patent Application No. 2000-228566 filed on Jul. 28, 2000 including specification, claims, drawings and abstract is incorporated herein by reference in its entirety.

What is claimed is:

1. A recording method for a photo addressable recording medium including an optical switching element and a display element, the optical switching element including a charge generating layer and a charge transport layer, a resistance component of the optical switching element being controlled at least depending on a direction of an applied voltage, the method comprising:

applying a periodic voltage to the display element for a period duration during both the case where the optical switching element is irradiated with light and the case where the optical switching element is not irradiated with light so that the periodic voltage applied to the display element for the period duration is greater than a threshold voltage of the display element to turn on a display thereof, wherein, in the case where the optical switching element is irradiated with light, after controlling an electrical charge amount of the display element by means of controlling a ratio of the resistance component depending at least on the direction of the periodic voltage and turning off the periodic voltage applied to the recording medium, the ratio of the resistance component is controlled by flowing charges generated by the charge generating layer through the charge transport layer, the display is turned off by applying a residual voltage to the display element, the residual voltage corresponding to the electrical charge amount and being effectively smaller than the threshold voltage and larger than a ground potential for a residual duration corresponding to a charge storage time greater than the period duration.

2. The recording method according to claim 1, wherein the display element has R, B and G layers corresponding to respective threshold voltages $V_R$, $V_B$ and $V_G$, and the threshold voltage corresponds to one of the respective threshold voltages.

3. The recording method according to claim 2, wherein the threshold voltage $V_R$ for the R layer corresponds to one of a first R threshold voltage $V_{1th-R}$ and a second R threshold voltage $V_{2th-R}$, the threshold voltage $V_B$ for the B layer corresponds to one of a first B threshold voltage $V_{1th-B}$ and a second B threshold voltage $V_{2th-B}$, the threshold voltage $V_G$ for the G layer corresponds to one of a first G threshold voltage $V_{1th-G}$ and a second G threshold voltage $V_{2th-G}$, and relative values of the respective threshold voltages rank in ascending orders of magnitude $V_{1th-R}$, $V_{1th-B}$, $V_{1th-G}$, $V_{2th-R}$, $V_{2th-B}$ and $V_{2th-G}$.

4. The recording method according to claim 3, wherein the periodic voltage corresponds to a light amount, the light amount that rank in ascending order of magnitude $L_0$, $L_1$, $L_2$, $L_3$, $L_4$, $L_5$ and $L_6$ in ascending order, the periodic voltage at $L_0$ being between $V_{1th-G}$ and $V_{2th-R}$ to produce black, the periodic voltage at $L_1$ being between $V_{2th-R}$ and $V_{2th-B}$ and the residual voltage is between the ground potential and $V_{1th-R}$ to produce red, the periodic voltage at $L_2$ being between $V_{2th-B}$ and $V_{2th-G}$ and the residual voltage is between the ground potential and $V_{1th-R}$ to produce magenta, the periodic voltage at $L_3$ being between $V_{2th-B}$ and $V_{2th-G}$ and the residual voltage is between $V_{1th-R}$ and $V_{1th-B}$ to produce blue, the periodic voltage at $L_4$ being above $V_{2th-G}$ and the residual voltage is between $V_{1th-R}$ and $V_{1th-B}$ to produce cyan, the periodic voltage at $L_5$ being above $V_{2th-G}$ and the residual voltage is between $V_{1th-B}$ and $V_{1th-G}$ to produce green, the periodic voltage at $L_6$ being above $V_{2th-G}$ and the residual voltage is between the ground potential and $V_{1th-R}$ to produce white.

5. The recording method according to claim 1, wherein the threshold voltage corresponds to one of a first threshold voltage that causes a low reflectivity of the display element and a second threshold voltage that causes a high reflectivity of the display element.

6. The recording method according to claim 1, wherein the threshold voltage is a second threshold voltage that causes a high reflectivity of the display element, and the residual voltage includes a voltage level greater than a first threshold voltage that causes a low reflectivity of the display element, the first threshold voltage being less than the second threshold voltage.

7. A recording method for a photo addressable recording medium including an optical switching element and a display element, the optical switching element including a charge generating layer and a charge transport layer, a resistance component of the optical switching element being controlled at least depending on a direction of an applied voltage, the method comprising:

when the optical switching element is not irradiated with light, applying a periodic voltage to the display element for a period duration so that the periodic voltage does not exceed a threshold voltage of the display element; and when the optical switching element is irradiated with light, controlling a ratio of the resistance component depending at least on the direction of the periodic voltage to control an electrical charge amount of the display element, thus applying the periodic voltage to the display element for the period duration to turn on a display thereon, the ratio of the resistance component being controlled by flowing charges generated by the charge generating layer through the charge transport layer, the periodic voltage exceeding the threshold voltage due to a partial voltage increased by the decrease of the resistance component of the optical switching element and an effectively generated voltage caused by a residual voltage to the display element corresponding to the electrical charge amount, the residual voltage being effectively smaller than the threshold voltage and larger than a ground potential for a residual duration corresponding to a charge storage time greater than the period duration.

8. The recording method according to claim 7, wherein the display element has R, B and G layers corresponding to respective threshold voltages $V_R$, $V_B$ and $V_G$, and the threshold voltage corresponds to one of the respective threshold voltages.

9. The recording method according to claim 8, wherein the threshold voltage $V_R$ for the R layer corresponds to one of a first R threshold voltage $V_{1th-R}$ and a second R threshold voltage $V_{2th-R}$, the threshold voltage $V_B$ for the B layer corresponds to one of a first B threshold voltage $V_{1th-B}$ and a second B threshold voltage $V_{2th-B}$, the threshold voltage $V_G$ for the G layer corresponds to one of a first G threshold voltage $V_{1th-G}$ and a second G threshold voltage $V_{2th-G}$, and relative values of the respective threshold voltages rank in ascending orders of magnitude $V_{1th-R}$, $V_{1th-B}$, $V_{1th-G}$, $V_{2th-R}$, $V_{2th-B}$ and $V_{2th-G}$.

10. The recording method according to claim 9, wherein the periodic voltage corresponds to a light amount, the light amount that rank in ascending order of magnitude $L_0$, $L_1$, $L_2$, $L_3$, $L_4$, $L_5$ and $L_6$ in ascending order, the periodic voltage at $L_0$ being between $V_{1th-G}$ and $V_{2th-R}$ to produce black, the periodic voltage at $L_1$ being between $V_{2th-R}$ and $V_{2th-B}$ and the residual voltage is between the ground potential and $V_{1th-R}$ to produce red, the periodic voltage at $L_2$ being between $V_{2th-B}$ and $V_{2th-G}$ and the residual voltage is between the ground potential and $V_{1th-R}$ to produce magenta, the periodic voltage at $L_3$ being between $V_{2th-B}$ and $V_{2th-G}$ and the residual voltage is between $V_{1th-R}$ and $V_{1th-B}$ to produce blue, the periodic voltage at $L_4$ being above $V_{2th-G}$ and the residual voltage is between $V_{1th-R}$ and $V_{1th-B}$ to produce cyan, the periodic voltage at $L_5$ being above $V_{2th-G}$ and the residual voltage is between $V_{1th-B}$ and $V_{1th-G}$ to produce green, the periodic voltage at $L_6$ being above $V_{2th-G}$ and the residual voltage is between the ground potential and $V_{1th-R}$ to produce white.

11. The recording method according to claim 7, wherein the threshold voltage corresponds to one of a first threshold voltage that causes a low reflectivity of the display element and a second threshold voltage that causes a high reflectivity of the display element.

12. A recording method for a photo addressable recording medium including an optical switching element and a display element, the optical switching element including a charge generating layer and a charge transport layer, a resistance component of the optical switching element being controlled at least depending on a polarity of an applied voltage, the method comprising:

applying a periodic voltage to the display element for a period duration during both the case where the optical switching element is irradiated with light and the case where the optical switching element is not irradiated with light so that the periodic voltage applied to the display element for the period duration is greater than a threshold voltage of the display element to turn on a display thereof, wherein, in the case where the optical switching element is irradiated with light, after controlling an electrical charge amount of the display element by means of controlling a ratio of the resistance component depending at least on the polarity of the periodic voltage and turning off the periodic voltage applied to the recording medium, the ratio of the resistance component is controlled by flowing charges generated by the charge generating layer through the charge transport layer, the display is turned off by applying a residual voltage to the display element, the residual voltage corresponding to the electrical charge, effectively smaller than the threshold voltage and larger than a ground potential for a residual duration corresponding to a charge storage time greater than the period duration.

13. The recording method according to claim 12, wherein the display element has R, B and G layers corresponding to respective threshold voltages $V_R$, $V_B$ and $V_G$, and the threshold voltage corresponds to one of the respective threshold voltages.

14. The recording method according to claim 13, wherein the threshold voltage $V_R$ for the R layer corresponds to one of a first R threshold voltage $V_{1th-R}$ and a second R threshold voltage $V_{2th-R}$, the threshold voltage $V_B$ for the B layer corresponds to one of a first B threshold voltage $V_{1th-B}$ and a second B threshold voltage $V_{2th-B}$, the threshold voltage $V_G$ for the G layer corresponds to one of a first G threshold voltage $V_{1th-G}$ and a second G threshold voltage $V_{2th-G}$, and relative values of the respective threshold voltages rank in ascending orders of magnitude $V_{1th-R}$, $V_{1th-B}$, $V_{1th-G}$, $V_{2th-R}$, $V_{2th-B}$ and $V_{2th-G}$.

15. The recording method according to claim 14, wherein the periodic voltage corresponds to a light amount, the light amount that rank in ascending order of magnitude $L_0$, $L_1$, $L_2$, $L_3$, $L_4$, $L_5$ and $L_6$ in ascending order, the periodic voltage at $L_0$ being between $V_{1th-G}$ and $V_{2th-R}$ to produce black, the periodic voltage at $L_1$ being between $V_{2th-R}$ and $V_{2th-B}$ and the residual voltage is between the ground potential and $V_{1th-R}$ to produce red, the periodic voltage at $L_2$ being between $V_{2th-B}$ and $V_{2th-G}$ and the residual voltage is between the ground potential and $V_{1th-R}$ to produce magenta, the periodic voltage at $L_3$ being between $V_{2th-B}$ and $V_{2th-G}$ and the residual voltage is between $V_{1th-R}$ and $V_{1th-B}$ to produce blue, the periodic voltage at $L_4$ being above $V_{2th-G}$ and the residual voltage is between $V_{1th-R}$ and $V_{1th-B}$ to produce cyan, the periodic voltage at $L_5$ being above $V_{2th-G}$ and the residual voltage is between $V_{1th-B}$ and $V_{1th-G}$ to produce green, the periodic voltage at $L_6$ being above $V_{2th-G}$ and the residual voltage is between the ground potential and $V_{1th-R}$ to produce white.

16. The recording method according to claim 12, wherein the threshold voltage corresponds to one of a first threshold voltage that causes a low reflectivity of the display element and a second threshold voltage that causes a high reflectivity of the display element.

17. The recording method according to claim 12, wherein the threshold voltage is a second threshold voltage that causes a high reflectivity of the display element, and the residual voltage includes a voltage level greater than a first threshold voltage that causes a low reflectivity of the display element, the first threshold voltage being less than the second threshold voltage.

18. A recording method for a photo addressable recording medium including an optical switching element and a display element, the optical switching element including a charge generating layer and a charge transport layer, a resistance component of the optical switching element being controlled at least depending on a polarity of an applied voltage, the method comprising:

when the optical switching element is not irradiated with light, applying a periodic voltage to the display element for a period duration so that the periodic voltage does not exceed a threshold voltage of the display element; and when the optical switching element is irradiated with light, controlling a ratio of the resistance component depending at least on the polarity of the periodic voltage to control an electrical charge amount of the display element, thus applying the periodic voltage to the display element for a period duration to turn on a display thereon, the ratio of the resistance component being controlled by flowing charges generated by the charge generating layer through the charge transport layer, the periodic voltage exceeding the threshold voltage due to a partial voltage increased by the decrease of the resistance component of the optical switching element and an effectively generated voltage caused by a residual voltage to the display element corresponding to the electrical charge, the residual voltage being effectively smaller than the threshold voltage and larger than a ground potential for a residual duration corresponding to a charge storage time greater than the period duration.

19. The recording method according to claim 18, wherein the display element has R, B and G layers corresponding to respective threshold voltages $V_R$, $V_B$ and $V_G$, and the threshold voltage corresponds to one of the respective threshold voltages.

20. The recording method according to claim 19, wherein the threshold voltage $V_R$ for the R layer corresponds to one of a first R threshold voltage $V_{1th-R}$ and a second R threshold voltage $V_{2th-R}$, the threshold voltage $V_B$ for the B layer corresponds to one of a first B threshold voltage $V_{1th-B}$ and a second B threshold voltage $V_{2th-B}$, the threshold voltage $V_G$ for the G layer corresponds to one of a first G threshold voltage $V_{1th-G}$ and a second G threshold voltage $V_{2th-G}$, and relative values of the respective threshold voltages rank in ascending orders of magnitude $V_{1th-R}$, $V_{1th-B}$, $V_{1th-G}$, $V_{2th-R}$, $V_{2th-B}$ and $V_{2th-G}$.

21. The recording method according to claim 20, wherein the periodic voltage corresponds to a light amount, the light amount that rank in ascending order of magnitude $L_0$, $L_1$, $L_2$, $L_3$, $L_4$, $L_5$ and $L_6$ in ascending order, the periodic voltage at $L_0$ being between $V_{1th-G}$ and $V_{2th-R}$ to produce black, the periodic voltage at $L_1$ being between $V_{2th-R}$ and $V_{2th-B}$ and the residual voltage is between the ground potential and $V_{1th-R}$ to produce red, the periodic voltage at $L_2$ being between $V_{2th-B}$ and $V_{2th-G}$ and the residual voltage is between the ground potential and $V_{1th-R}$ to produce magenta, the periodic voltage at $L_3$ being between $V_{2th-B}$ and $V_{2th-G}$ and the residual voltage is between $V_{1th-R}$ and $V_{1th-B}$ to produce blue, the periodic voltage at $L_4$ being above $V_{2th-G}$ and the residual voltage is between $V_{1th-R}$ and $V_{1th-B}$ to produce cyan, the periodic voltage at $L_5$ being above $V_{2th-G}$ and the residual voltage is between $V_{1th-B}$ and $V_{1th-G}$ to produce green, the periodic voltage at $L_6$ being above $V_{2th-G}$ and the residual voltage is between the ground potential and $V_{1th-R}$ to produce white.

22. The recording method according to claim 18, wherein the threshold voltage corresponds to one of a first threshold voltage that causes a low reflectivity of the display element and a second threshold voltage that causes a high reflectivity of the display element.

* * * * *